US008568894B2

(12) United States Patent
Bernal-Lara et al.

(10) Patent No.: US 8,568,894 B2
(45) Date of Patent: Oct. 29, 2013

(54) FILMS AND ARTICLES WITH GOOD TASTE AND/OR ODOR PERFORMANCE

(75) Inventors: Teresa E. Bernal-Lara, Houston, TX (US); Andrea Hazlitt, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 362 days.

(21) Appl. No.: 12/999,809

(22) PCT Filed: Jul. 2, 2009

(86) PCT No.: PCT/US2009/049493
§ 371 (c)(1),
(2), (4) Date: Dec. 17, 2010

(87) PCT Pub. No.: WO2010/003047
PCT Pub. Date: Jan. 7, 2010

(65) Prior Publication Data
US 2011/0097523 A1    Apr. 28, 2011

Related U.S. Application Data

(60) Provisional application No. 61/077,729, filed on Jul. 2, 2008.

(51) Int. Cl.
*B32B 27/08* (2006.01)

(52) U.S. Cl.
USPC ........ 428/516; 428/484.1; 524/261; 524/210; 524/81; 526/348

(58) Field of Classification Search
USPC ................. 524/261, 210, 81; 428/516, 484.1; 526/348
See application file for complete search history.

(56) References Cited

U.S. PATENT DOCUMENTS

| 4,590,125 A | 5/1986 | Balloni et al. |
| 5,272,236 A | 12/1993 | Lai et al. |

(Continued)

FOREIGN PATENT DOCUMENTS

| DE | 4435803 A1 | 4/1996 |
| DE | 10060478 A1 | 6/2002 |

(Continued)

OTHER PUBLICATIONS

Song, et al., "Migration of Volatile Degradation Products into Ozonated Water from Plastic Packaging Materials", Food Additives & Contaminants, 2003, p. 985-994, vol. 20, issue10.

(Continued)

*Primary Examiner* — Michael C Miggins

(57) ABSTRACT

The invention provides a film comprising at least one layer formed from a composition comprising a propylene-based polymer and a saturated compound, selected from the group consisting of aliphatic amides, hydrocarbon waxes, hydrocarbon oils, fluorinated hydrocarbons, siloxanes, and combinations thereof; and wherein the propylene-based polymer has less than 0.01 mole percent total unsaturations, as determined by 1H NMR. The invention also provides a composition comprising a propylene-based polymer and a saturated compound, selected from the group consisting of aliphatic amides, hydrocarbon waxes, hydrocarbon oils, fluorinated hydrocarbons, siloxanes, and combinations thereof, and wherein the propylene-based polymer comprises (A) at least 60 weight percent (wt %) units derived from propylene, and (B) from 1 to 40 wt % units derived from ethylene, and wherein the propylene polymer is characterized by at least one of the following properties: (1) a g' ratio of less than one, measured at polymer number average molecular weight ($M_n$), (2) a relative compositional drift of less than 50%, and (3) propylene chain segments having a chain isotacticity triad index of at least 70 mole percent. The invention also provides a film comprising at least one layer formed from a composition comprising a ethylene-based polymer and a saturated compound, selected from the group consisting of aliphatic amides, hydrocarbon waxes, hydrocarbon oils, fluorinated hydrocarbons, siloxanes, and combinations thereof, and wherein the ethylene-based polymer has a density greater than, or equal to, 0.930 g/cc.

14 Claims, 6 Drawing Sheets

(56) References Cited

U.S. PATENT DOCUMENTS

| | | | |
|---|---|---|---|
| 5,902,854 A | 5/1999 | Kelley et al. | |
| 6,960,635 B2 | 11/2005 | Stevens et al. | |
| 2002/0006482 A1 | 1/2002 | Falla et al. | |
| 2002/0020672 A1 | 2/2002 | Kirk | |
| 2003/0232912 A1 | 12/2003 | Rosenthal et al. | |
| 2004/0222165 A1 | 11/2004 | Michocki et al. | |
| 2006/0064953 A1 | 3/2006 | Wong | |
| 2007/0179230 A1 | 8/2007 | Sperlich et al. | |
| 2010/0075079 A1* | 3/2010 | Bernal-Lara et al. | 428/35.2 |
| 2010/0125114 A1 | 5/2010 | Williams et al. | |
| 2010/0285253 A1 | 11/2010 | Hughes et al. | |

FOREIGN PATENT DOCUMENTS

| | | |
|---|---|---|
| EP | 687706 A1 | 12/1995 |
| EP | 1209187 A1 | 5/2002 |
| EP | 1808291 A1 | 7/2007 |
| WO | 9213029 A1 | 8/1992 |
| WO | 9604833 A1 | 2/1996 |
| WO | 9611231 A2 | 4/1996 |
| WO | 0068106 A1 | 11/2000 |
| WO | 03/040195 A1 | 5/2003 |
| WO | 2004043155 A2 | 5/2004 |
| WO | 2004067273 A1 | 8/2004 |
| WO | 2008082975 A1 | 7/2008 |

OTHER PUBLICATIONS

Peeling, et al., "Surface Ozonation and Photooxidation of Polyethylene Film", Journal of Polymer Science, Polymer Chemistry Edition, 1983, p. 2047-55, vol. 21, issue 7.

Jin-Gab, et al., "Ozone and Its Current and Future Application in the Food Industry", Advances in Food and Nutrition Research, 2003, p. 167-218, vol. 45 (Abstract).

White, et al., "Ozonation Effect on Taste in Water Packaged in High Density Polyethylene Bottles", Journal of Dairy Science, 1991, p. 96-9, vol. 74, No. 1.

PCT/US09/049493 International Preliminary Report on Patentability.

PCT/US09/049493 International Search Report.

PCT/US09/049493 Written Opinion.

* cited by examiner

FILMS AND ARTICLES WITH GOOD TASTE AND/OR ODOR PERFORMANCE

REFERENCE TO RELATED APPLICATIONS

This application claims the benefit of U.S. Provisional Application No. 61/077,729, filed on Jul. 2, 2008.

BACKGROUND OF INVENTION

In the packaging industry, ozone ($O_3$) is commonly used for sterilization of drinking water. During the bottling process, ozone is applied as the last step to disinfect and kill any air-borne microorganisms that may be present at the time of filling. Due to its strong oxidizing character, ozone can effectively kill microorganisms, however, ozone can also cause undesirable reactions with the plastic package. The products and byproducts of these reactions are responsible for the off-taste odor that characterizes ozonated water, especially if packaged in flexible polyolefin containers.

The effects of ozone on polyethylene-based polymers and other polymers have been published. For example, see the following: (a) *Migration of Volatile Degradation Products into Ozonated Water from Plastic Packaging Materials*; Song, Y. S.; Al-Taher, F.; Sadler, G. *Food Additives & Contaminants*, (2003), 20(10), 985-994 (identifies volatile compounds and their concentration in water after ozonation of several types of plastic materials, and compares the concentration found, with that approved by the FDA); (b) *The Influence of Different Sterilization Methods on Chemical and Physical Properties of Food Packaging Made of Plastics*; Steiner, I.; Grundschober, J.; Dobias, J.; Sipek, M.; Washuttl, J.; Voldrich, M.; *Lebensmittelchemie*, (1999), 53(3), 59, Abstract (discusses the effects of sterilization (ozone, $H_2O_2$, $ClO_2$ and γ-irradn) on polyethylene bottles, foils and PET); (c) *Changes in a Polyethylene Food Packaging Film Following Ozone Sterilization*; Steiner, Ingrid; *Deutsche Lebensmittel-Rundschau*, (1991), 87(4), 107-12, Abstract (discusses the effects of ozone sterilization on polyethylene film and on the antioxidant butylhydroxyanisole); (d) *Ozonation Effect on Taste in Water Packaged in High Density Polyethylene Bottles*; White, C. H.; Gough, R. H.; McGregor, J. U.; Vickroy, V. V.; *Journal of Dairy Science*, (1991), 74(1), 96-9, Abstract (discusses the off-taste produced by the ozonation of water, bottled in containers formed from high density polyethylene, and also discusses a treatment using butylated hydroxytoluene); (e) *Surface Ozonation and Photooxidation of Polyethylene Film*; Peeling, James; Clark, David T; *Journal of Polymer Science, Polymer Chemistry Edition* (1983), 21(7), 2047-55 (describes the surface effects of ozone and photo-oxidation on film formed from high density polyethylene and low density polyethylene); and (f) *Ozone and Its Current and Future Application in the Food Industry*; Kim Jin-Gab; Yousef Ahmed E; Khadre Mohammed A; *Advances in Food and Nutrition Research* (2003), 45 167-218, Abstract (reviews the use of ozone as a sanitizer in the food industry).

Zeolites, silicates and flavor protectants have been used in an attempt to eliminate odors from sterilized water. U.S. Publication No. 2002/0020672 discloses an in-situ method of treating ozone sterilized water to remove unwanted odors and tastes produced during the sterilization process. Odors are removed by the incorporation of a zeolite into the cap or cap liner of a container.

However, the use of one or more additives to improve taste and odor, such as a zeolite, a silicate or a flavor protectant, will increase the cost of a resin formulation.

International Publication No. WO 92/13029 discloses a process for eliminating odor producing and taste producing substances in plastic materials, by adding a substantially hydrophobic aluminum silicate molecular sieve to the plastic material. The plastic material is preferably an ethylene plastic or a propylene plastic.

European Patent EP 0687706B1 (Abstract) discloses a polyolefin-based composition comprising a lubricating agent, and a zeolite (crystalline aluminosilicate). The polyolefin composition can be used for molded articles, such as plastic bottles.

International Publication No. WO 96/04833 discloses a liner composition for a potable fluid container. The composition contains an inactivated hydrazine, and/or an inorganic sulfite and/or a tocopherol compound for preventing off-flavors due to the presence of aldehydes in the fluid.

German application DE 100 60 478 A1 (Abstract) discloses a method for obtaining water free from bacteria and smells, comprising treating of water with ozone in a container filled with active carbon and/or substances containing zeolite.

International Publication No. WO 00/68106 discloses a bottled liquid, such as bottled water, where the liquid has little or no plastic off-taste. The bottle contains a closure liner which comprises a plastic matrix and an organic slip agent dispersed in the plastic matrix. The slip agent is substantially fully ethylenically saturated, and the liner is substantially free of an ethylenically unsaturated compound. Suitable ethylenically saturated slip agents include behenamide, polysiloxane, fluoropolymers, paraffin wax, carbowax, synthetic mineral oil and mixtures thereof.

U.S. Publication No. 2004/0222165 discloses methods of packaging ozone sterilized products in plastic film containers, wherein adverse organoleptic reactions or interactions are substantially reduced. Ozone sterilized water is packaged in flexible plastic pouches having an inner polyethylene liner formed from polyethylene, which does not contain slip agents or other organic processing aids that may react with ozone.

International Publication No. WO2004/067273 discloses a multilayer film that contains a first and second outer layer, each including a polymer; and an internal layer including an oxygen scavenger. At least one of the first and second outer layers includes a blend of a polymer, a siloxane having a viscosity of from $1 \times 10^7$ centistokes to $5 \times 10^7$ centistokes, and an antiblock agent.

However, there is a need for polyolefin compositions for use in packaging of ozone treated liquids, and especially ozone treated water, which lead to a reduction in the off-taste and odor of the liquid. There a further need for polyolefin compositions that does not require the use of additives, in addition to the standard processing additives, for taste and odor reduction. Also, there is a need in the packaging industry for polyolefins with improved heat seal strength and/or hot tack strength, which can be used to improve package integrity and/or increase packaging speed, with minimal formation of by-products that cause off-taste and odor. These needs and others have been met by the following invention.

SUMMARY OF THE INVENTION

The invention provides a film comprising at least one layer formed from a composition comprising a propylene-based polymer and a saturated compound, selected from the group consisting of aliphatic amides, hydrocarbon waxes, hydrocarbon oils, fluorinated hydrocarbons, siloxanes, and combinations thereof; and wherein the propylene-based polymer has less than 0.01 mole percent total unsaturations, as determined by 1H NMR.

The invention also provides a composition comprising a propylene-based polymer and a saturated compound, selected from the group consisting of aliphatic amides, hydrocarbon waxes, hydrocarbon oils, fluorinated hydrocarbons, siloxanes, and combinations thereof, and wherein the propylene-based polymer comprises (A) at least 60 weight percent (wt %) units derived from propylene, and (B) from 1 to 40 wt % units derived from ethylene, and wherein the propylene polymer is characterized by at least one of the following properties: (1) a g' ratio of less than one, measured at polymer number average molecular weight ($M_n$), (2) a relative compositional drift of less than 50%, and (3) propylene chain segments having a chain isotacticity triad index of at least 70 mole percent.

The invention also provides a film comprising at least one layer formed from a composition comprising a ethylene-based polymer and a saturated compound, selected from the group consisting of aliphatic amides, hydrocarbon waxes, hydrocarbon oils, fluorinated hydrocarbons, siloxanes, and combinations thereof, and wherein the ethylene-based polymer has a density greater than, or equal to, 0.930 g/cc.

DETAILED DESCRIPTION OF THE INVENTION

Figure 1:
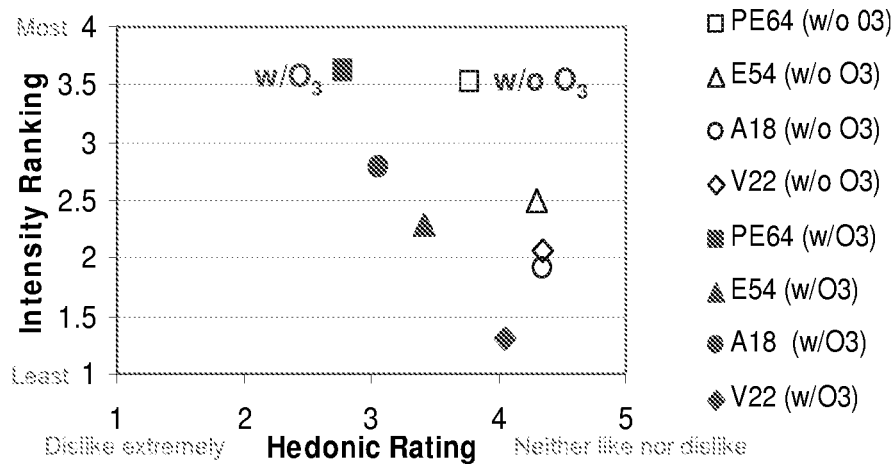
FIG. 1 depicts the hedonic ratings for non-ozonated water and ozonated water samples, each exposed to the noted films.

As discussed above, the invention provides a film comprising at least one layer formed from a composition comprising a propylene-based polymer and a saturated compound, selected from the group consisting of aliphatic amides, hydrocarbon waxes, hydrocarbon oils, fluorinated hydrocarbons, siloxanes, and combinations thereof; and wherein the propylene-based polymer has less than 0.01 mole percent total unsaturations, as determined by 1H NMR.

In one embodiment, the composition comprises only one of the noted saturated compounds.

In one embodiment, the film comprises at least two layers, and has a heat seal strength greater than 3 lb/inch, at a sealing temperature from 90° C. to 95° C., preferably from 90° C. to 93° C.

In one embodiment, the film comprises at least three layers, and has a heat seal strength greater than 3 lb/inch, at a sealing temperature from 90° C. to 95° C., preferably from 90° C. to 93° C.

In one embodiment, the film has a heat seal strength of at least 3 lb/inch, at a sealing temperature of greater than 90° C.

In one embodiment, the film comprises at least two layers, and has a heat seal strength of at least 3 lb/inch, at a sealing temperature of greater than 90° C.

In one embodiment, the film comprises at least three layers, and has a heat seal strength of at least 3 lb/inch, at a sealing temperature of greater than 90° C.

In one embodiment, the film comprises at least two layers, and has a Hot Tack Initiation Temperature less than 85° C., preferably less than 80° C., more preferably less than, or equal to, 76° C.

In one embodiment, the film comprises at least three layers, and has a Hot Tack Initiation Temperature less than 85° C., preferably less than 80° C., more preferably less than, or equal to, 76° C.

In one embodiment, the film has a Hot Tack Window (sealing temperature range at which a seal strength of at least 4 n/inch is obtained) delta of at least 20° C. larger that that of a referenced propylene-based polymer. Referenced propylene-based polymer=V22, as described herein.

In one embodiment, the film comprises at least two layers, and has a the Hot Tack Window (sealing temperature range at which a seal strength of at least 4 n/inch is obtained) delta of at least 20° C. larger that that of a referenced propylene-based polymer. Referenced propylene-based polymer=V22, as described herein.

In one embodiment, the film comprises at least three layers, and has a the Hot Tack Window (sealing temperature range at which a seal strength of at least 4 n/inch is obtained) delta of at least 20° C. larger that that of a referenced propylene-based polymer. Referenced propylene-based polymer=V22, as described herein.

In one embodiment, the film comprises at least three layers, and wherein at least one outer layer is formed from the composition comprising a propylene-based polymer and a saturated compound, selected from the group consisting of aliphatic amides, hydrocarbon waxes, hydrocarbon oils, fluorinated hydrocarbons, siloxanes, and combinations thereof, and wherein the propylene-based polymer has less than 0.01 mole percent total unsaturations, as determined by 1H NMR. In a further embodiment, a core layer is formed from a composition comprising a HDPE, a polypropylene homopolymer, or a propylene-based polymer. In one embodiment, the composition comprises only one of the noted saturated compounds.

In one embodiment, the film comprises at least two layers, and wherein at least one layer is formed from the composition comprising a propylene-based polymer and a saturated compound, selected from the group consisting of aliphatic amides, hydrocarbon waxes, hydrocarbon oils, fluorinated hydrocarbons, siloxanes, combinations thereof, and wherein the propylene-based polymer has less than 0.01 mole percent total unsaturations, as determined by 1H NMR. In a further embodiment, the other layer is formed from a composition comprising a HDPE, a polypropylene homopolymer, or a propylene-based polymer. In one embodiment, the composition comprises only one of the noted saturated compounds.

In one embodiment, the film has a seal strength of at least 2 lb/inch at a sealing temperature in the range from 100° C. or less.

In one embodiment, the film has an ultimate seal strength greater than 4 lb/in.

In one embodiment, the film has a hot tack strength of at least 4 N/in, at a sealing temperature in the range from 100° C. or less.

In one embodiment, the film has an ultimate hot tack strength greater than 5 N/in.

The invention also provides a composition comprising a propylene-based polymer and a saturated compound, selected from the group consisting of aliphatic amides, hydrocarbon waxes, hydrocarbon oils, fluorinated hydrocarbons, siloxanes, and combinations thereof, and wherein the propylene-based polymer comprises (A) at least 60 weight percent (wt %) units derived from propylene, and (B) from 1 to 40 wt % units derived from ethylene, and wherein the propylene polymer is characterized by at least one of the following properties: (1) a g' ratio of less than one, measured at polymer number average molecular weight ($M_n$), (2) a relative compositional drift of less than 50%, and (3) propylene chain segments having a chain isotacticity triad index of at least 70 mole percent. In one embodiment, the composition comprises only one of the noted saturated compounds.

In one embodiment, the propylene-based polymer has at least two of properties (1), (2) and (3).

In one embodiment, the propylene-based polymer has properties (1), (2) and (3).

The invention provides a film comprising at least three layers, and wherein at least one outer layer is formed from an inventive composition. In a further embodiment, a core layer formed from a composition comprising a HDPE, a polypropylene homopolymer, or a propylene-based polymer.

The invention also provides a film comprising at least two layers, and wherein at least one layer is formed from an inventive composition. In a further embodiment, the other layer is formed from a composition comprising a HDPE, a polypropylene homopolymer, or a propylene-based polymer.

In one embodiment, the film has a seal strength of at least 2 lb/inch, at a sealing temperature in the range from 100° C. or less.

In one embodiment, the film has an ultimate seal strength greater than 4 lb/in.

In one embodiment, the film has a hot tack strength of at least 4 N/in, at a sealing temperature in the range from 100° C. or less.

In one embodiment, the film has an ultimate hot tack strength greater than 5 N/in.

An inventive film may comprise a combination of two or more embodiments as described herein.

In one embodiment, the propylene-based polymer comprises the following: (A) at least 60 weight percent (wt %) units derived from propylene, and (B) from 1 to 40 wt % units derived from ethylene, and wherein the propylene-based polymer is characterized by at least one of the following properties: (1) a g' ratio of less than one, measured at polymer number average molecular weight ($M_n$), (2) a relative compositional drift of less than 50%, and (3) propylene chain segments having a chain isotacticity triad index of at least 70 mole percent.

In one embodiment, the propylene-based polymer has at least two of properties (1), (2) and (3).

In one embodiment, the propylene-based polymer has properties (1), (2) and (3).

In one embodiment, the g' ratio is less than 0.96. In one embodiment, the g' ratio is less than 0.75.

In one embodiment, the relative compositional drift of less than 40%, preferably less than 30%.

In one embodiment, the propylene chain segments have a chain isotacticity triad index of at least 80 mole percent, preferably at least 90 mole percent.

In one embodiment, the propylene-based polymer comprises from 1 to 20 weight percent units derived from ethylene, based on the total weight of the polymer.

In one embodiment, the propylene-based polymer is characterized by at least one of the following properties:
(a) a weight average molecular weight (Mw) of at least 50,000 grams per mole (g/mol);
(b) an Mw/Mn of less than 4;
(c) a critical shear rate at the onset of surface melt fracture (OSMF) of at least 4,000 sec−1;
(d) an I10/I2 at 230° C. greater than or equal to (≥) 5.63;
(e) a nominal weight percent crystallinity from greater than 0 to 40 wt %; and, preferably,
(f) a single melting point as measured by differential scanning calorimetry (DSC).

In one embodiment, the propylene-based polymer is characterized by at least one of the following properties:
(a) a weight average molecular weight ($M_w$) of at least 50,000 grams per mole (g/mol);
(b) a $M_w/M_n$ of less than 4;
(c) a critical shear rate at the onset of surface melt fracture (OSMF) of at least 4,000 sec$^{-1}$; and
(d) a nominal weight percent crystallinity from greater than 2 to 40 weight percent.

In one embodiment, the propylene-based polymer comprises at least two of properties (a)-(d).

In one embodiment, the propylene-based polymer comprises at least three of properties (a)-(d).

In one embodiment, the propylene-based polymer comprises all of properties (a)-(d).

In one embodiment, the propylene-based polymer has a $M_w$ of at least 100,000 g/mol.

In one embodiment, the propylene-based polymer has a $M_w/M_n$ of less than 3.5.

In one embodiment, the propylene-based polymer is a propylene/ethylene polymer.

In one embodiment, the propylene/ethylene polymer comprises from 2 to 30 weight percent ethylene, based on the total weight of the polymer.

In one embodiment, the propylene-based polymer has a melt flow rate (MFR) from 0.1 to 100 g/10 min.

In one embodiment, the propylene-based polymer has a melt flow rate (MFR) from 1 to 10 g/10 min.

In one embodiment, the propylene-based polymer has a density from 0.84 to 0.90 g/cc, preferably from 0.86 to 0.88 g/cc.

A propylene-based polymer may comprise a combination of two or more embodiments as described herein.

In one embodiment, the saturated compound contains a structural unit represented by Formula (I):

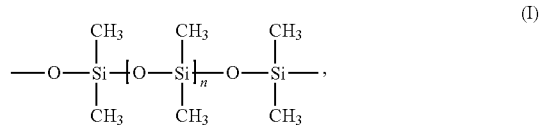

where n is greater than 10.

In one embodiment, the saturated compound is represented by Formula (II):

wherein n is greater than, or equal to, 6.

In one embodiment, the saturated compound is a hydrocarbon wax.

In one embodiment, the saturated compound is a hydrocarbon oil.

In one embodiment, the saturated compound is a fluorinated hydrocarbon.

A composition may comprise a combination of two or more embodiments as described herein.

An inventive film may comprise a combination of two or more embodiments as described herein.

The invention also provides a laminate structure comprising an inventive film, and a substrate, and wherein the film is laminated to the substrate.

The invention also provides a laminate structure comprising a film formed from an inventive composition, and a substrate, and wherein the film is laminated to the substrate.

In one embodiment, the substrate is formed from a composition comprising at least one selected from foil, polyamide, polyester, ethylene/vinyl alcohol (EVOH) copolymers, polyvinylidene chloride (PVDC), polyethylene terepthalate (PET), oriented polypropylene (OPP), ethylene/vinyl acetate (EVA) copolymers, ethylene/acrylic acid (EM) copolymers, ethylene/methacrylic acid (EMAA) copolymers, SiOx coated films, PVDC coated films, ULDPE, LLDPE, HDPE, MDPE, LMDPE, LDPE, ionomers, graft-modified polymers, paper, or combinations thereof.

In one embodiment, the substrate is formed from a composition comprising at least one selected from foil, polyamide, ethylene/vinyl alcohol (EVOH) copolymers, polyvinylidene chloride (PVDC), polyethylene terepthalate (PET), oriented polypropylene (OPP), SiOx coated films, or PVDC coated films.

An inventive laminate structure may comprise a combination of two or more embodiments as described herein.

The invention also provides an article comprising at least one component formed from an inventive film.

The invention also provides an article comprising at least one component formed from an inventive composition.

The invention also provides an article comprising at least one component formed from an inventive laminate structure.

In one embodiment, the article is a film pouch. In a further embodiment, the pouch comprises at least two layers or plies.

The invention also provides a film pouch, wherein an interior layer of the pouch is formed from an inventive film.

The invention provides a film pouch, wherein an interior layer of the pouch is formed from an inventive composition.

The invention provides a film pouch comprising at least one component formed from an inventive composition. In a further embodiment, the pouch comprises at least two layers or plies.

In one embodiment, an outer layer of the pouch is formed from a composition comprising a HDPE, a polypropylene homopolymer, or a propylene-based polymer. In a further embodiment, the outer layer is the exterior (skin layer) of the pouch.

In one embodiment, an outer layer of the pouch is formed from a composition comprising a HDPE, a polypropylene homopolymer, or a propylene-based polymer. In a further embodiment, the outer layer is the exterior (skin layer) of the pouch.

An inventive article may comprise a combination of two or more embodiments as described herein.

An inventive pouch may comprise a combination of two or more embodiments as described herein.

The invention provides a film comprising at least one layer formed from a composition comprising a ethylene-based polymer and a saturated compound, selected from the group consisting of aliphatic amides, hydrocarbon waxes, hydrocarbon oils, fluorinated hydrocarbons, siloxanes, and combinations thereof, and wherein the ethylene-based polymer has a density greater than, or equal to, 0.930 g/cc, preferably greater than, or equal to, 0.935 g/cc. In one embodiment, the composition comprises only one of the noted saturated compounds.

In one embodiment, the ethylene-based polymer has a density greater than, or equal to, 0.940 g/cc, preferably greater than, or equal to, 0.945 g/cc.

In one embodiment, the ethylene-based polymer has a density greater than, or equal to, 0.950 g/cc, preferably greater than, or equal to, 0.955 g/cc.

In one embodiment, the film consists only of one layer.

In one embodiment, the composition comprises greater than 80 weight percent, preferably greater than 90 weight percent, of the ethylene-based polymer, based on the total weight of the composition.

In one embodiment, the film further comprises a layer formed from a composition comprising a propylene-based polymer, and wherein the film has a heat seal strength of at least 3 lb/inch, at a sealing temperature from 90° C. to 100° C.

In one embodiment, the film further comprises a layer formed from a composition comprising a propylene-based polymer, and wherein the film has a heat seal strength of at least 3 lb/inch, at a sealing temperature from 90° C. to 95° C.

In one embodiment, the film further comprises a layer formed from a composition comprising a propylene-based polymer, and wherein the film has a heat seal strength of at least 3 lb/inch, at a sealing temperature from 90° C. to 93° C.

In one embodiment, the saturated compound contains a structural unit represented by Formula (I):

$$-O-\underset{\underset{CH_3}{|}}{\overset{\overset{CH_3}{|}}{Si}}-[O-\underset{\underset{CH_3}{|}}{\overset{\overset{CH_3}{|}}{Si}}]_n-O-\underset{\underset{CH_3}{|}}{\overset{\overset{CH_3}{|}}{Si}}-, \qquad (I)$$

where n is greater than 10.

In one embodiment, the saturated compound is represented by Formula (II):

$$CH_3-(CH_2)_n-CONH_2 \qquad (II),$$

wherein n is greater than, or equal to, 6.

In one embodiment, the saturated compound is a hydrocarbon wax.

In one embodiment, the saturated compound is a hydrocarbon oil.

In one embodiment, the saturated compound is a fluorinated hydrocarbon.

The invention provides an article comprising at least one component formed from an inventive film.

In one embodiment, the article is a film pouch.

An ethylene-based polymer may comprise a combination of two or more embodiments as described herein.

A composition may comprise a combination of two or more embodiments as described herein.

An inventive film may comprise a combination of two or more embodiments as described herein.

An inventive article may comprise a combination of two or more embodiments as described herein.

The invention provides films, and compositions that can be used to form films, each with minimal contribution to taste and/or odor of ozone sterilized water, when compared to films made of typical polyethylene sealants, such as, ethylene-octene, ethylene-butene, linear low density polyethylene and low density polyethylene. The inventive films show good sealant and organoleptic properties for flexible packaging of ozone sterilized water.

Propylene-Based Polymer

The propylene-based polymers of this invention include, but are not limited to, propylene/ethylene, propylene/ethylene/1-butene, propylene/ethylene/ENB, propylene/ethylene/1-hexene, propylene/ethylene/1-octene, propylene/1-hexene, propylene/1-pentene, propylene/1-nonene, propylene/1-decene, propylene/1-heptene, propylene/4-methyl-1-pentene and propylene/1-butene. In a preferred embodiment, the propylene-based polymer is a propylene/ethylene interpolymer.

In one embodiment, the propylene-based polymer has a melt flow rate (MFR) greater than, or equal to, 0.1 g/10 min, preferably greater than, or equal to, 0.2 g/10 min, more preferably greater than, or equal to, 0.5 g/10 min, and even more preferably greater than, or equal to, 0.8 g/10 min. In another embodiment, the propylene-based interpolymer has a melt flow rate (MFR) less than, or equal to, 100, preferably less than, or equal to 50, more preferably less than, or equal to 20 g/10 min, and even more preferably less than, or equal to 10 g/10 min. The MFR is measured according to ASTM D-1238 (2.16 kg, 230° C.). In a preferred embodiment, the propylene-based polymer is a propylene/ethylene interpolymer. In a further embodiment, the ethylene content of the interpolymer ranges from 0.1 to 30 weight percent, preferably from 0.5 to 25 weight percent, and more preferably from 1 to 20 weight percent, based on the total weight of the polymer. In one embodiment, the propylene/ethylene interpolymer comprises from 2 to 30 weight percent ethylene, based on the total weight of the polymer.

In another embodiment, the propylene-based polymer has a density less than, or equal to, 0.92 g/cc, preferably less than, or equal to, 0.91 g/cc, and more preferably less than, or equal to, 0.90 g/cc. In another embodiment, the propylene-based polymer has a density greater than, or equal to, 0.84 g/cc, preferably greater than, or equal to, 0.85 g/cc, and more preferably greater than, or equal to, 0.86 g/cc. In a preferred embodiment, the propylene-based polymer is a propylene/ethylene interpolymer. In a further embodiment, the ethylene content of the interpolymer ranges from 0.1 to 30 weight percent, preferably from 0.5 to 25 weight percent, and more preferably from 1 to 20 weight percent, based on the total weight of the polymer. In one embodiment, the propylene/ethylene interpolymer comprises from 2 to 30 weight percent ethylene, based on the total weight of the polymer.

In another embodiment, the propylene-based polymer has a molecular weight distribution less than, or equal to, 5, and preferably less than, or equal to, 4.5, and more preferably less than, or equal to 4. In another embodiment, the molecular weight distribution is greater than, or equal to, 1.2, preferably greater than, or equal to, 1.5, more preferably greater than, or equal to 2. In a preferred embodiment, the propylene-based polymer is a propylene/ethylene interpolymer. In a further embodiment, the ethylene content of the interpolymer ranges from 0.1 to 30 weight percent, preferably from 0.5 to 25 weight percent, and more preferably from 1 to 20 weight percent, based on the total weight of the polymer. In one embodiment, the propylene/ethylene interpolymer comprises from 2 to 30 weight percent ethylene, based on the total weight of the polymer.

In a preferred embodiment, the propylene-based polymer comprises the following: (A) at least 60 weight percent (wt %) units derived from propylene (based on the total weight of polymer), and (B) between greater than zero and 40 wt % units derived from ethylene (based on the total weight of polymer). The propylene-based polymer further characterized by at least one of the following properties: (1) a g' ratio of less than 1, preferably less than 0.95, more preferably less than 0.85 and even more preferably less than 0.80, measured at polymer number average molecular weight (Mn), (2) a relative compositional drift of less than 50%, and (3) propylene chain segments having a chain isotacticity triad index of at least 70 mole percent. Such a propylene-based polymer is represented by the NV22 polymer (see the experimental section below).

In another embodiment, the propylene-based polymer is characterized by at least two of properties (1), (2) and (3), for example, (1) and (2), or (1) and (3), or (2) and (3). In another embodiment, the propylene-based polymer is characterized by properties (1), (2) and (3).

In one embodiment, the propylene-based polymer, and preferably a propylene/ethylene interpolymer, is characterized by at least one of the following properties:
  (a) a weight average molecular weight (Mw) of at least 50,000 grams per mole (g/mol);
  (b) an Mw/Mn of less than 4;
  (c) a critical shear rate at the onset of surface melt fracture (OSMF) of at least 4,000 sec−1;
  (d) an I10/I2 at 230° C. greater than or equal to (≥) 5.63;
  (e) a nominal weight percent crystallinity from greater than 0 to 40 wt %; and, preferably,
  (f) a single melting point as measured by differential scanning calorimetry (DSC).

Such a propylene-based polymer is represented by the NV22 polymer (see the experimental section below).

In one embodiment, the propylene-based polymer, and preferably a propylene/ethylene interpolymer, is further characterized by at least one of (b) through (f).

In one embodiment, the propylene-based polymer, and preferably a propylene/ethylene interpolymer, is further characterized by at least one of (c) through (f).

In one embodiment, the propylene-based polymer, and preferably a propylene/ethylene interpolymer, is further characterized by at least one of (d) through (f).

In one embodiment, the propylene-based polymer, and preferably a propylene/ethylene interpolymer, is further characterized by at least one of (e) and (f).

In one embodiment, the propylene-based polymer, and preferably a propylene/ethylene interpolymer, is further characterized by at least one of (a), (b), (d), (e), and (f).

In one embodiment, the propylene-based polymer is characterized as comprising the following: (A) from 60 to less than 100 weight percent, preferably from 80 to 99 weight percent, and more preferably from 85 to 99 weight percent, units derived from propylene (based on the total weight of the polymer), and (B) from greater than zero to 40 weight percent, preferably from 1 to 20 weight percent, more preferably from 2 to 16 weight percent, and even more preferably from 3 to 10 weight percent, units derived from at least one of ethylene and/or a C4-30 α-olefin (based on the total weight of the polymer). The polymer further contains an average of at least 0.001, preferably an average of at least 0.005 and more preferably an average of at least 0.01, long chain branches/1000 total carbons. The maximum number of long chain branches in the propylene interpolymer is not critical to the definition of this invention, but typically it does not exceed 3 long chain branches/1000 total carbons. Such a propylene-based polymer is represented by the NV22 polymer (see the experimental section below).

Suitable C4-30 α-olefins that can be used in the practice of this invention include, but are not limited to, isobutylene, 1-butene, 1-pentene, 1-hexene, 1-heptene, 1-octene, 1-nonene, 1-decene, 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, and vinylcyclohexane.

The polymer, as represented by NV22, may be prepared by polymerizing propylene and at least one of ethylene and/or a C4-30 α-olefin, under continuous solution polymerization conditions, in the presence of a catalyst composition comprising a hafnium complex of a polyvalent aryloxyether. The catalyst includes an activating cocatalyst, and the polymerization conditions typically include a temperature from 120 to 250° C. and a pressure from 100 kPa to 300 MPa, preferably from 100 kPa to 50 MPa. These propylene-based polymers, their polymerization conditions and catalysts are described in U.S. Provisional Application No. 60/988,999 (filed November 2007), fully incorporated herein by reference. The process for making the propylene interpolymers of this invention does not require the use of a diene or other chain extender. The propylene-based polymer exhibits higher shear thinning behavior, higher melt strengths and improved processing, as compared to propylene-based polymers of like composition and structure, but without long chain branching. Such a propylene-based polymer is represented by the NV22 polymer (see the experimental section below).

The metal complexes are activated in various ways to yield catalyst compounds having a vacant coordination site that will coordinate, insert, and polymerize addition polymerizable monomers, especially olefin(s). For the purposes of this patent specification and appended claims, the term "activator" or "cocatalyst" means any compound or component or method which can activate the metal complex in the foregoing manner. Non-limiting examples of suitable activators include Lewis acids, non-coordinating ionic activators, ionizing activators, organometallic compounds, and combinations of the foregoing substances capable of converting the neutral metal complex to a catalytically active species.

"Substantially isotactic propylene sequences," and similar terms, mean that the sequences have an isotactic triad (mm) mole fraction, measured by 13C NMR, greater than about 0.70, preferably greater than about 0.80, more preferably greater than about 0.85, and most preferably greater than about 0.90. Isotactic triad measurements are well known in the art, and are described in, for example, U.S. Pat. No. 5,504,172 and WO 00/01745 that refer to the isotactic sequence in terms of a triad unit in the copolymer molecular chain determined by 13C NMR spectra. NMR spectra are determined as follows.

The 13C NMR spectroscopy is one of a number of techniques known in the art for measuring comonomer incorporation into a polymer. An example of this technique is described for the determination of comonomer content for ethylene/α-olefin copolymers in Randall (Journal of Macromolecular Science, Reviews in Macromolecular Chemistry and Physics, C29 (2 & 3), 201-317 (1989)). The basic procedure for determining the comonomer content of an olefin interpolymer involves obtaining the 13C NMR spectrum, under conditions where the intensity of the peaks, corresponding to the different carbons in the sample, is directly proportional to the total number of contributing nuclei in the sample. Methods for ensuring this proportionality are known in the art, and involve allowance for sufficient time for relaxation after a pulse, the use of gated-decoupling techniques, relaxation agents, and the like. The relative intensity of a peak or group of peaks is obtained in practice from its computer-generated integral. After obtaining the spectrum, and integrating the peaks, those peaks associated with the comonomer are assigned. This assignment can be made by reference to known spectra or literature, or by synthesis and analysis of model compounds, or by the use of isotopically labeled comonomer. The mole percent comonomer can be determined by the ratio of the "integrals corresponding to the number of moles of comonomer" to the "integrals corresponding to the number of moles of all of the monomers in the interpolymer," as described in Randall, for example.

The data is collected using a Varian UNITY Plus 400 MHz NMR spectrometer, corresponding to a 13C resonance frequency of 100.4 MHz. Acquisition parameters are selected to ensure quantitative 13C data acquisition in the presence of the relaxation agent. The data is acquired using gated 1H decoupling, 4000 transients per data file, a 6 sec. pulse repetition delay, spectral width of 24,200 Hz, and a file size of 32K data points, with the probe head heated to 130° C. The sample is prepared by adding approximately 3 mL of a 50/50 mixture of tetrachloroethane-d2/orthodichlorobenzene that is 0.025M in chromium acetylacetonate (relaxation agent) to 0.4 g sample in a 10 mm NMR tube. The headspace of the tube is purged of oxygen by displacement with pure nitrogen. The sample is dissolved and homogenized by heating the tube and its contents to 150° C., with periodic refluxing initiated by heat gun.

Following data collection, the chemical shifts are internally referenced to the mmmm pentad at 21.90 ppm. Isotacticity at the triad level (mm) is determined from the methyl integrals representing the mm triad (22.5 to 21.28 ppm), the mr triad (21.28-20.40 ppm), and the rr triad (20.67-19.4 ppm). The percentage of mm tacticity is determined by dividing the intensity of the mm triad by the sum of the mm, mr, and rr triads. For propylene-ethylene copolymers, the integral regions are corrected for ethylene and regio-error by subtracting the contribution, using standard NMR techniques, once the peaks have been identified. This can be accomplished, for example, by analyzing a series of copolymers of various levels of monomer incorporation, by literature assignments, by isotopic labeling, or other means which are known in the art. See U.S. Provisional Application No. 60/988,999 (filed November 2007), fully incorporated herein by reference.

The term "linear" as here used means that the propylene polymer does not have long chain branching. That is, the polymer chains comprising the bulk linear propylene polymer have an absence of long chain branching, as for example the traditional random propylene polymers made using Ziegler-Natta polymerization processes (e.g., U.S. Pat. No. 4,612,300).

U.S. Pat. No. 4,500,648 teaches that long chain branching (LCB) frequency can be represented by the equation $LCB=b/M_w$, wherein b is the weight average number of long chain branches per molecule and $M_w$ is the weight average molecular weight. The molecular weight averages and the long chain branching characteristics are determined by gel permeation chromatography and intrinsic viscosity methods. The presence of long chain branching can be determined in propylene/ethylene copolymers by a number of different methods using 13C nuclear magnetic resonance (NMR) spectroscopy, and is quantified using the method described by Randall (Rev. Macromol. Chem. Phys., C29, V. 2 & 3, p. 285-297).

As a practical matter, conventional 13C NMR spectroscopy cannot determine the length of a long chain branch in excess of six carbon atoms. However, there are other known techniques useful for determining the presence of long chain branches in propylene/ethylene interpolymers. Two such methods are gel permeation chromatography coupled with a low angle, laser light scattering detector (GPC-LALLS) and gel permeation chromatography coupled with a differential viscometer detector (GPC-DV). The use of these techniques for long chain branch detection, and the underlying theories, have been well documented in the literature. See, for example, Zimm, G. H. and Stockmayer, W. H., J. Chem. Phys., 17, 1301 (1949) and Rudin, A., Modern Methods of Polymer Characterization, John Wiley & Sons, New York (1991) pp. 103-112.

The triple detector GPC method for quantifying long chain branching in polyolefins is clearly described by Wood-Adams, Paula M.; Dealy, John M.; deGroot, A. Willem; Redwine, O. David, in Effect of Molecular Structure on the Linear Viscoelastic Behavior of Polyethylene, Macromolecules (2000), 33(20), 7489-7499. This coupled with the technique described by Scholte et al., in Journal of Applied Polymer Science, Vol. 29, 3763-3782 (1984) teaches one skilled in the art how to make a simple correction for randomly branched copolymers. See U.S. Provisional Application No. 60/988,999 (filed November 2007), fully incorporated herein by reference.

In one embodiment, the propylene-based polymer is characterized as having an I10/I2 at 230° C. (as determined by ASTM D-1238) greater than or equal to ($\geq$) 5.63, preferably from 6.5 to 15, and more preferably from 7 to 10. The molecular weight distribution (Mw/Mn or MWD), measured by gel permeation chromatography (GPC), is defined by the equation: $Mw/Mn \leq (I10/I2) - 4.63$, and is preferably between 1.5 and 2.5. The I10/I2 ratio indicates the degree of long chain branching, i.e., the larger the I10/I2 ratio, the more long chain branching in the polymer.

Such propylene-based polymers have a highly unexpected flow property, where the I10/I2 value at 230° C. of the polymer is essentially independent of the polydispersity index (i.e., $M_w/M_n$) of the polymer. This is contrasted with linear propylene-based polymers having rheological properties, such that, to increase the I10/I2 value, the polydispersity index must also be increased.

The weight average molecular weight ($M_w$) of the propylene-based polymer is typically at least 50,000, more typically at least 100,000, and even more typically at least 200,000, grams per mole (g/mol). The maximum $M_w$ can vary with a host of variables, for example, polymerization conditions, comonomers, chain transfer agents, etc., but typically the maximum does not exceed 1,000,000, more typically it does not exceed 750,000, and even more typically it does not exceed 500,000, g/mol.

Polymer weight-average molecular weight ($M_w$) is measured by gel permeation chromatography (GPC), one technique of which as described in U.S. Pat. No. 5,272,236. Alternatively, melt index, I2, I10 or I21, measured, for example, according to ASTM to ASTM D-1238 at 230° C., may be employed as an indication of molecular weight. Generally, melt index is inversely related to the molecular weight of the polymer. The higher the molecular weight, the lower the melt index, although the relationship is not necessarily linear. Monomer conversion is typically measured by gas chromotography (GC) or infrared (IR) spectroscopic analysis of the reaction mixture exiting the reactor, using a probe inserted into the reactor or into an effluent stream from the reactor. See U.S. Provisional Application No. 60/988,999 (filed November 2007), fully incorporated herein by reference.

The polydispersity or molecular weight distribution (MWD or $M_w/M_n$) of the propylene interpolymers of this invention is typically less than 4, more typically less than 3.5, even more typically less than 3, and still more typically less than 2.8. The density of these polymers (as determined by ASTM D-792-00, Method B) is typically from 0.85 to 0.90, more typically from 0.855 to 0.895, and even more typically from 0.86 to 0.89, grams per cubic centimeter (g/cc). See U.S. Provisional Application No. 60/988,999 (filed November 2007), fully incorporated herein by reference.

The g' ratio is the ratio of the intrinsic viscosity value for the branched propylene-based polymer, and for example, a propylene/ethylene copolymer divided by the intrinsic viscosity value for the linear propylene-ethylene copolymer having similar ethylene content, i.e., polymer density, and similar molecular weight, i.e., melt flow rate. "Similar" means within twenty percent (20%) of each value. These g' ratios are calculated at the number average molecular weight ($M_n$) and weight average molecular weight values ($M_w$).

$$g' = (IV\text{branched}/IV\text{linear})$$

The IV values are obtained at $M_n$ and $M_w$ values. See U.S. Provisional Application No. 60/988,999 (filed November 2007), fully incorporated herein by reference.

Such a propylene-based polymer is further characterized as having a resistance to melt fracture. An apparent shear stress versus apparent shear rate plot is used to identify the melt fracture phenomena. According to Ramamurthy, in the Journal of Rheology, 30(2), 337-357, 1986, above a certain critical flow rate, the observed extrudate irregularities may be broadly classified into two main types: surface melt fracture and gross melt fracture. Surface melt fracture occurs under apparently steady flow conditions, and ranges in detail from loss of specular film gloss to the more severe form of "sharkskin." The onset of surface melt fracture (OSMF) is characterized at the beginning of losing extrudate gloss, at which the surface roughness of the extrudate can be detected by 40 times magnification. See U.S. Provisional Application No. 60/988,999 (filed November 2007), fully incorporated herein by reference.

Differential scanning calorimetry (DSC) is a common technique that can be used to examine the melting and crystallization of semi-crystalline polymers. General principles of DSC measurements and applications of DSC to studying semi-crystalline polymers are described in standard texts (for instance, E. A. Turi, ed., "Thermal Characterization of Polymeric Materials", Academic Press, 1981).

The term "crystallinity" refers to the regularity of the arrangement of atoms or molecules forming a crystal structure. Polymer crystallinity can be examined using DSC. The term "Tme" means the temperature at which the melting ends, and the term "Tmax" means the peak melting temperature, both as determined by one of ordinary skill in the art from DSC analysis using data from the final heating step. One suitable method for DSC analysis uses a model Q1000™ DSC from TA Instruments, Incorporated. Calibration of the DSC is performed in the following manner First, a baseline is obtained by heating the cell from −90° C. to 290° C., without any sample in the aluminum DSC pan. Then seven milligrams of a fresh indium sample is analyzed by heating the sample to 180° C., cooling the sample to 140° C. at a cooling rate of 10° C./min, followed by keeping the sample isothermally at 140° C. for one minute, followed by heating the sample from 140° C. to 180° C. at a heating rate of 10° C./min.

The heat of fusion and the onset of melting of the indium sample are determined and checked to be within 0.5° C. from 156.6° C. for the onset of melting, and within 0.5 J/g from 28.71 J/g for the heat of fusion. Then deionized water is analyzed by cooling a small drop of fresh sample in the DSC pan from 25° C. to −30° C. at a cooling rate of 10° C./min. The sample is kept isothermally at −30° C. for two minutes, and heated to 30° C. at a heating rate of 10° C./min The onset of melting is determined and checked to be within 0.5° C. from 0° C.

Samples of polymer are pressed into a thin film at a temperature of 190° C. About five to eight milligrams of sample is weighed out and placed in a DSC pan. A lid is crimped on the pan to ensure a closed atmosphere. The sample pan is placed in the DSC cell, and then heated at a high rate of about 100° C./min, to a temperature of about 30° C. above the polymer melt temperature. The sample is kept at this temperature for about three minutes. Then the sample is cooled at a rate of 10° C./min to −40° C., and kept isothermally at that temperature for three minutes. Consequently the sample is heated at a rate of 10° C./min, until melting is complete. The resulting enthalpy curves are analyzed for peak melt temperature, onset and peak crystallization temperatures, heat of fusion and heat of crystallization, Tme, Tmax, and any other quantity of interest from the corresponding thermograms, as described in U.S. Pat. No. 6,960,635. The factor that is used to convert heat of fusion into nominal weight percent crystallinity is 165 J/g=100 wt % crystallinity. With this conversion factor, the total crystallinity of a propylene-based copolymer (units: weight percent crystallinity) is calculated as the heat of fusion divided by 165 J/g, and multiplied by 100 percent. See U.S. Provisional Application No. 60/988,999 (filed November 2007), fully incorporated herein by reference.

Compositional Drift Analysis

The GPC-FT/IR technique allows for the measurement of fractional polymer compositions as a function of polymer molecular weight. This characterization technique utilizes gel permeation chromatography (GPC) coupled with Fourier Transform Infrared Spectroscopy (FT/IR). For this analysis, a Waters high temperature GPC unit (#150C) is coupled to a Magna System 560 FT/IT (Water Corp, Milford, Mass.). The mobile phase or solvent is tetrachloroethylene. The following references described this technique.

P. J. Deslauriers, D. C. Rohlfing, E. T. Hsieh, "Quantifying Short Chain Branching in Ethylene 1-Olefin Copolymers using Size Exclusion Chromatography and Fourier Transform Infrared Spectroscopy," Polymer, 43, 159-170 (2002).

R. P. Markovich, L. G. Hazlitt, L. Smith, ACS Symposium Series: Chromatography of Polymers, 521, 270-276 (1993). The samples are dissolved in tetrachloroethylene and analyzed on the GPC-FT/IR. The samples are separated by molecular weight fraction, and, as these fractions elute, they are analyzed by the FT/IR. For propylene-based polymers, the infrared spectral region from 2750 to 3050 $cm^{-1}$ is obtained as a function of molecular weight. Within this spectral region, the partial absorbance area at greater than 2940 $cm^{-1}$ is used for the methyl content. From these measurements, one skilled in the art can develop ethylene content calibration curves for comparing the compositional drift of the samples versus the molecular weight distribution. The compositional drift is calculated as the weight percent ethylene content at the 90% cumulative GPC fraction, and at the 10% cumulative GPC fraction. These two ethylene values are subtracted and the result is then divided by the weight percent ethylene content of the sample. See U.S. Provisional Application No. 60/988,999 (filed November 2007), fully incorporated herein by reference.

A propylene-based polymer may comprise a combination of two or more embodiments as described herein.

Ethylene-Based Polymer

In one embodiment, the ethylene-based polymer has a density greater than, or equal to, 0.930 g/cm³, preferably greater than, or equal to, 0.935 g/cm³, and more preferably greater than, or equal to, 0.940 g/cm³. In one embodiment, the ethylene-based polymer is an ethylene-based interpolymer. In another embodiment, the ethylene-based polymer is a polyethylene homopolymer.

In one embodiment, the ethylene-based polymer has a density greater than, or equal to, 0.945 g/cm³, preferably greater than, or equal to, 0.950 g/cm³, and more preferably greater than, or equal to, 0.955 g/cm³. In one embodiment, the ethylene-based polymer is an ethylene-based interpolymer. In another embodiment, the ethylene-based polymer is a polyethylene homopolymer.

In one embodiment, the ethylene-based polymer has a density less than, or equal to, 0.970 g/cm³, preferably less than, or equal to, 0.968 g/cm³. In another embodiment, the density ranges from 0.930 to 0.970 g/cm³, and preferably from 0.935 to 0.968 g/cm³, and more preferably from 0.937 to 0.965 g/cm³. In one embodiment, the ethylene-based polymer is an ethylene-based interpolymer. In another embodiment, the ethylene-based polymer is a polyethylene homopolymer.

In one embodiment, the ethylene-based polymer has a melt index, $I_2$, (190° C., 2.16 kg weight, ASTM 1238-03) greater than, or equal to, 0.1 g/10 min, preferably greater than, or equal to, 0.2 g/10 min, and more preferably greater than, or equal to, 0.5 g/10 min. In one embodiment, the ethylene-based polymer is an ethylene-based interpolymer. In another embodiment, ethylene-based polymer is a polyethylene homopolymer.

In another embodiment, the ethylene-based polymer has a melt index, $I_2$, less than, or equal to, 50 g/10 min, preferably less than, or equal to, 20 g/10 min, and more preferably less than, or equal to, 10 g/10 min, and even more preferably than, or equal to, 5 g/10 min. In one embodiment, the ethylene-based polymer is an ethylene-based interpolymer. In another embodiment, the ethylene-based polymer is a polyethylene homopolymer.

In another embodiment, the ethylene-based polymer is an ethylene/α-olefin interpolymer. In a preferred embodiment, the α-olefin is a C3-C20 α-olefin, a preferably a C4-C20 α-olefin, and more preferably a C4-C12 α-olefin, and even more preferably a C4-C8 α-olefin and most preferably C6-C8 α-olefin. The α-olefins include, but are not limited to, propylene 1-butene, 1-pentene, 1-hexene, 4-methyl-1-pentene, 1-heptene, and 1-octene. Preferred α-olefins include propylene, 1-butene, 1-pentene, 1-hexene, 4-methyl-1-pentene, 1-heptene, and 1-octene. Especially preferred α-olefins include 1-hexene and 1-octene, and more preferably 1-hexene. The α-olefin is desirably a C3-C8 α-olefin, and more desirably a C4-C8 α-olefin and most desirably a C6-C8 α-olefin.

Interpolymers include ethylene/butene-1 (EB) copolymers, ethylene/hexene-1 (EH), ethylene/octene-1 (EO) copolymers, ethylene/alpha-olefin/diene modified (EAODM) interpolymers such as ethylene/propylene/diene modified (EPDM) interpolymers and ethylene/propylene/octene terpolymers. Preferred copolymers include EB, EH and EO copolymers, and most preferred copolymers are EH and EO.

The ethylene-based polymer may comprise a combination of two or more embodiments as described herein.

Saturated Compounds

Suitable saturated compounds include hydrocarbon waxes, hydrocarbon oils, fluorinated hydrocarbons, aliphatic amides and siloxanes.

Suitable hydrocarbon waxes include paraffin wax, carbowax, beeswax, and waxes of general formula, $CH_3$—$(CH_2)_n$—$CH_3$, where each n is greater than 20, and preferably greater than 25. In one embodiment, N is from 17 to 50.

Suitable hydrocarbon oils include mineral oils, vegetable oils, petroleum oils, animal oils, and oils of general formula, $CH_3$—$(CH_2)_n$—$CH_3$, where n is less than 20. Additional oils include straight chain or branched chain paraffins, which do not contain carbon-carbon double bonds and do not contain carbon-carbon triple bonds.

Suitable fluorinated hydrocarbons include tetra fluoroethylene polymers, polyvinylidene fluoride and hexafluoropropylene.

Useful silicone compounds for use in the inventive compositions include siloxane polymers containing the structural unit general formula (I) below.

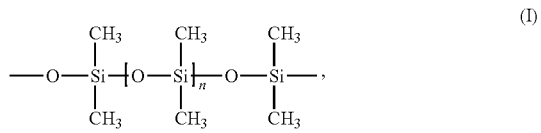

In formula (I), n is greater than, or equal to 10, preferably greater than or equal to 20. These compounds are typically end capped with an alkyl group, such as a methyl group or ethyl group, or propyl group, and typically with methyl. These compounds may also be end capped with a vinyl group, such as $CH=CH_2$, although such are not preferred. An example of a masterbatch of such a compound is AMPACET 101724-U, available from Ampacet.

Silicon compounds have been used by others as mold release agents, and as abrasion resistant agents (see U.S. Pat. No. 5,902,854). However, it has been discovered that silicon compounds work well as slip agents in compositions containing the propylene-based interpolymers, as described herein, and, in addition, do not contribute negatively to taste and odor aspects of the composition, especially when exposed to ozonated water.

Additional suitable compounds include aliphatic amides, such as benhenamide (docosaamide), stearamide (octadecanamide) and ethylene-bis-stearamide.

Some suitable amides are of formula (II) below:

where n is greater than, or equal to, 6, preferably greater than, or equal to, 10, and more preferably greater than, or equal to, 14. In a further embodiment, n is less than, or equal to, 30, preferably less than, or equal to, 25, and more preferably less than, or equal to, 20. Additional amides include straight chain aliphatic amides, which do not contain carbon-carbon double bonds or carbon-carbon triple bonds, and branched aliphatic amides, which do not contain carbon-carbon double bonds or carbon-carbon triple bonds.

In one embodiment, the composition used to form the at least one layer, also contains a saturated compound as discussed above. This saturated compound is preferably present in an amount from 0.05 to 5.0 weight percent, preferably from 0.1 to 3.0 weight percent, more preferably from 0.5 to 2.0 weight percent, and even more preferably from 1.0 to 2.0 weight percent, based on the total weight of the composition.

Additives

An inventive composition may comprise at least one additive. Stabilizers and antioxidants may be added to a resin formulation to protect the resin from degradation, caused by reactions with oxygen, which are induced by such things as heat, light, or residual catalyst from the raw materials. Other additives include, but are not limited to, ultraviolet light absorbers, antistatic agents, pigments, dyes, nucleating agents, fillers, slip agents, fire retardants, plasticizers, processing aids, lubricants, stabilizers, smoke inhibitors, viscosity control agents and anti-blocking agents. Additives may also be used to modify COF, afford antifogging characteristics, to pigment the film, and/or to alter film permeability. The film may be surface treated for printing. In one embodiment, the film compositions do not contain an adhesive In certain embodiments, the propylene-based polymers, as described above, may be blended with other materials, which include recycled and scrap materials and diluent polymers, to the extent that the improved sealant properties are maintained. Propylene-based polymers can also be added to one or more layers in a blend to improve the softness, bubble stability and shrink performance of the film.

Preferred Films

Preferred films (or film compositions) contain at least one layer formed from a composition containing one or more propylene-based polymers as discussed above, and more preferably one or more propylene/ethylene interpolymers, as discussed above. Preferably the one or more polymer(s) is/are present from 50 to 99.9 weight percent, more preferably from 60 to 99.5 weight percent, and even more preferably from 77 to 99 weight percent (based on the total weight of the composition used to form the at least one layer). Each film composition may comprise one or more additives.

In another embodiment, the composition, used to form the at least one layer, also contains a siloxane component as discussed above. This siloxane component is preferably present in an amount from 0.1 to 3.0 weight percent, more preferably from 0.5 to 2.0 weight percent, and even more preferably from 1.0 to 2.0 weight percent, based on the total weight of the composition. Optionally, the composition may also contain an antiblock, such as a diatomaceous earth, and preferably, this component is present in an amount from 0 to 2.0 weight percent, based on the total weight of the composition. In addition, the composition may optionally contain a processing aid, such as a fluoropolymer-based processing aid, and preferably this component is present in an amount from 0 to 0.15 weight percent, based on the total weight of the composition.

In another embodiment, the film composition contains at least three layers. In a further embodiment, a HDPE is sandwiched between two films, wherein an outer layer is formed from an inventive composition or a composition used to form an inventive film (collectively termed "inventive composition"). In another embodiment, both outer layers are each, independently, formed from an inventive composition, and preferably both are formed from the same inventive composition. In a further embodiment, the film composition is formed from a coextrusion process.

In another embodiment, a propylene homopolymer is sandwiched between two films, wherein an outer layer is formed from an inventive composition. In another embodiment, both outer layers are each, independently, formed from an inventive composition, and preferably both are formed from the same inventive composition. In a further embodiment, the film composition is formed from a coextrusion process.

In another embodiment, a polyethylene-based polymer with a density greater than 0.930, preferably greater than 0.935 g/cc, is sandwiched between two films, wherein an outer layer is formed from an inventive composition. In another embodiment, both outer layers are each, independently, formed from an inventive composition, and preferably both are formed from the same inventive composition. In a further embodiment, the film composition is formed from a coextrusion process.

In another embodiment, a propylene-based polymer, and preferably a propylene-based interpolymer, is sandwiched between two films, wherein an outer layer is formed from an inventive composition. In another embodiment, both outer layers are each, independently, formed from an inventive composition, and preferably both are formed from the same inventive composition. In a further embodiment, the film composition is formed from a coextrusion process. In another embodiment, the propylene-based polymer is an INSPIRE polymer, available from The Dow Chemical Company.

In a preferred embodiment, the invention provides a film comprising at least three layers, and preferably three consecutive layers, such as A/B/A. In a further embodiment, film consists of three layers, such as A/B/A.

In one embodiment, the two outer layers are formed from the same inventive composition (Composition A). The invention also provides a film pouch formed from one of the above films.

In one embodiment, inventive Composition A comprises at least one polymer selected from a propylene-based polymer, as described above. In a further embodiment, the propylene-based polymer is a propylene/ethylene interpolymer, as described herein. In a further embodiment, the propylene/ethylene polymer has a density from 0.86 g/cc to 0.91 g/cc, and preferably from 0.87 g/cc to 0.90 g/cc. In another embodiment, the propylene/ethylene interpolymer has a melt flow rate (MFR) from 0.5 g/10 min to 10 g/10 min, and preferably from 0.8 g/10 min to 5 g/10 min. The propylene/ethylene interpolymer may have a combination of two or more embodiments as described herein. The invention also provides a film pouch formed from one of the above films.

In another embodiment, inventive Composition A further comprises a siloxane polymer. In another embodiment, Composition A further comprises a fluoropolymer. In another embodiment, Composition A further comprises diatomaceous earth. Composition A may comprise a combination of two or more of these embodiments. The invention also provides a film pouch formed from one of these films.

In another embodiment Composition A does not contain an unsaturated slip agent and does not contain a linear low density ethylene/α-olefin interpolymer, and does not contain a low density polyethylene (LDPE). In another embodiment Composition A does not contain an unsaturated slip agent and/or does not contain a linear low density ethylene/α-olefin interpolymer and/or a low density polyethylene (LDPE).

In another embodiment, the inner layer of the film formed from three layers, A/B/A, is formed from a composition (Composition B) comprising at least one polymer selected from a high density polyethylene (HDPE), a medium density polyethylene (MDPE), a propylene-based interpolymer, a propylene homopolymer, an impact modified polypropylene, a linear low density polyethylene (LLDPE, preferably with a density from 0.93-0.94 g/cc), and combinations thereof. In another embodiment, the inner layer of the film formed from three layers, A/B/A, is formed from a composition (Composition B) comprising at least one polymer selected from a high density polyethylene (HDPE), a medium density polyethylene (MDPE), a propylene-based interpolymer, a propylene homopolymer, and combinations thereof.

The high density polyethylene preferably has a density from 0.94 g/cc to 0.97 g/cc. The medium density polyethylene preferably has a density from 0.93 g/cc to 0.94 g/cc. In another embodiment, the linear low density polyethylene is formed from a gas phase process. In another embodiment, the linear low density polyethylene is an ethylene/hexene copolymer or an ethylene/butene copolymer, and preferably those copolymers formed from a solution process.

Composition B may comprise a combination of two or more of these embodiments. The invention also provides a film pouch formed from one of the above films.

In another embodiment, the film comprises at least two layer B/A. In a further embodiment, each layer is formed from Composition A or Composition B, each as described above.

In another embodiment, the film comprises three layers, C/B/A, where layer C can have the same composition as Composition B, or Composition A, or any polymers or blends, and preferably polymers and blends suitable for extrusion processes.

In a further embodiment, the composition used to form Layer C also comprises one or more additives, such as slip, antiblock, processing aid, combinations thereof, or any other additive material useful for extrusion In one embodiment, the film is formed by a coextrusion process.

In one embodiment, the A/B/A film has a thickness ratio from 15/70/15 to 25/50/25, and more preferably from 18/64/18 to 22/56/22, and even more preferably 20/60/20.

In another embodiment the film has a thickness from 1 mil to 10 mils, more preferably from 1.5 mils to 7 mils, and even more preferably from 2 to 4 mils.

A film may comprise a combination of two or more of the above embodiments. The invention also provides a pouch formed from one of the above films.

Preparation of Film

A film (or film composition) of the invention can be prepared by selecting the polymers suitable for making each layer, forming a film of each layer, and bonding the layers, or coextruding, or casting one or more layers. Desirably, the film layers are bonded continuously over the interfacial area between film layers.

In a preferred embodiment, the inventive films are formed using a blown film process or a cast film process. In another embodiment, the films are formed using a double bubble process. Films may be oriented using procedures known in the art, such as an "in-line" or an "off-line" stretching apparatus.

The propylene-based interpolymers can be used in neat form or in blends, in either the outer layer(s) or the core layer, depending on the balance of properties required. The inventive film may be used in existing forms. The films can also be printed and used for packaging purposes. In certain embodiments the films may be laminated to other substrates to produce laminates with specific property requirements (for example, a PET//BOPE for temperature resistance/differential and modulus, or a PA//BOPE for impact strength and barrier, or a PET//PA//BOPE or a BOPP//BOPE, or SiOx (silicon oxide) coated films). In certain embodiments, the films may also be metallized to improve the $O_2TR$ and water vapor barrier. In other embodiments, the films may also be coextruded with barrier materials, such as polyvinylidene barrier resins or polyamides or EVOH resins.

For each layer, typically, it is suitable to extrusion blend, melt blend or dry blend the components and any additional additives, such as stabilizers and polymer processing aids. The extrusion blending should be carried out in a manner, such that an adequate degree of dispersion is achieved. The parameters of extrusion blending will necessarily vary, depending upon the components. However, typically, the total polymer deformation, that is, mixing degree, is important, and is controlled by, for example, the screw-design and the melt temperature. The melt temperature during film forming will depend on the film components.

After extrusion blending, a film structure is formed. Film structures may be made by conventional fabrication techniques, for example, bubble extrusion, biaxial orientation processes (such as tenter frames or double bubble processes), cast/sheet extrusion, coextrusion and lamination.

Other film manufacturing techniques are disclosed in U.S. Pat. No. 6,723,398 (Chum et al.). Post processing techniques, such as radiation treatment and corona treatment, especially for printing applications, can also be accomplished with the materials of the invention.

Sheets of the film composition can be bonded by heat sealing or by use of an adhesive. Heat sealing can be effected using conventional techniques, including, but not limited to, a hot bar, impulse heating, side welding, ultrasonic welding, or other alternative heating mechanisms, as discussed above.

The film compositions of the aforementioned processes may be made to any thickness depending upon the application. In one embodiment, the film compositions have a total thickness of from 5 to 1000 microns, preferably from 10 to 500 microns, more preferably from 12 to 100 microns. The permeability may also be adjusted depending upon the application.

Applications

The inventive compositions are particularly suitable in the formation of single layered or multi-layered films.

The single or multilayer film may find utility in a variety of applications. Preferred applications, which make use of the film's improved sealing properties and good stiffness, include, pouches for packaging flowable material (especially pouches made using vertical form-fill-seal equipment), heavy-duty shipping sacks and overwrap film. Other applications include, but are not limited to, multilayer or monolayer packaging structures, where the structure is oriented (preferably biaxially oriented) for shrink film and barrier shrink applications; cook-in packaged foods; liners (such as cap liners); gaskets and lidding stock; bags; bottles; and caps.

The film structure comprises one, two, or three or more layers. In one embodiment, the film structure is a three layer structure with a propylene-based polymer layer, as a core layer, interposed between a layer formed from an inventive composition and an outer layer. Other suitable core layers can be formed from a HDPE, a polypropylene homopolymer, a propylene-based interpolymer, and an INSPIRE™ polymer (available from the Dow Chemical Company). The outer may be formed from an ethylene-based polymer, a propylene-based polymer, HDPE, VERSIFY™ polymer, a polyester, such as polyethylene terephthalate (PET), or other suitable polymers.

As discussed above, some suitable three-layered films include the following structures: (a) inv. film/HDPE/inv. film, (b) inv. film/rPP/inv. film and (c) inv. film/hPP/inv. film; where "inv. film" refers to "inventive film (or film formed from an inventive composition)," "rPP" refers to random propylene interpolymer, and "hPP" refers to propylene homopolymer.

A multilayer film structure of the invention may any thickness, required in its intended use. Preferably, however, the total thickness is in the range from 0.25 mil to 50 mils, more preferably in the range of from 0.4 mils to 40 mils, and even more preferably from 1 mils to 10 mils. The sealant layer (and an outer layer, if present, such as in a three layer structure) may preferably constitute from about 2 to about 50 percent of the total film thickness, more preferably from about 10 to 45 percent of the total film thickness.

The invention provides a pouch comprising at least one film layer formed from an inventive composition.

In one embodiment, the pouch is formed from a film composition in the shape of a rectangle, and wherein the shorter ends of the rectangle are sealed together to form a cylinder. The cylinder is then sealed at both open ends to form a pouch.

In another embodiment, a pouch is formed by sealing the shorter ends of two rectangular surface areas of the same dimensions to form an open bag-like structure. The top end of the structure is also sealed, and a third piece of film is inserted into the periphery of the lower end, and sealed along the perimeter of the lower end.

Film pouch designs suitable for use in the invention include commercially available pouches used to contain fruit drinks and other beverages. Such pouches are commonly sold in grocery stores.

DEFINITIONS

The term "about," as used herein, in reference to a given numerical value, refers to values within ±10% of the given numerical value, unless otherwise stated.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer, usually employed to refer to polymers prepared from only one type of monomer, and the term interpolymer as defined hereinafter.

The term "interpolymer," as used herein, refers to polymers prepared by the polymerization of at least two different types of monomers. The generic term interpolymer thus includes copolymers, usually employed to refer to polymers prepared from two different types of monomers, and polymers prepared from more than two different types of monomers.

The term "ethylene-based polymer," as used herein, refers to a polymer that comprises a majority weight percent of polymerized ethylene monomers (based on the total weight of the polymer).

The term "ethylene-based interpolymer," as used herein, refers to a polymer that comprises a majority weight percent of polymerized ethylene monomers (based on the total weight of the interpolymer), and at least one comonomer.

The term, "propylene-based polymer," as used herein, refers to a polymer that comprises a majority weight percent of polymerized propylene monomers (based on the total weight of the polymer).

The term, "propylene-based interpolymer," as used herein, refers to a polymer that comprises a majority weight percent of polymerized propylene monomers (based on the total weight of interpolymer), and at least one comonomer.

The terms "blend" or "polymer blend," as used herein, mean a blend of two or more polymers. Such a blend may or may not be miscible (not phase separated at the molecular level). Such a blend may or may not be phase separated. Such a blend may or may not contain one or more domain configurations, as determined from transmission electron microscopy, light scattering, x-ray scattering, and other methods known in the art.

The term "film," as used herein, refers to a film structure with at least one layer or ply.

The term "multilayered film," as used herein, refers to a film structure with more than one layer or ply.

The term "core layer," as used herein, in reference to a film structure, refers to a film layer that is co-contiguous with another film on each surface.

The terms "skin" or "skin layer," as used herein, refer to an outermost, exterior film layer.

The term "outer layer," as used herein, refers to a layer adjacent to an inner layer (the inner layer may be a core layer of a film structure, or the interior layer of an article, such as a pouch). An outer layer may or may not be a skin layer.

The term "saturated compound," as used herein, refers to small molecules, oligomers and polymers, which each does not contain a carbon-carbon double bond, and does not contain a carbon-carbon triple bond.

Test Methods

The densities of the propylene-based polymers and the ethylene-based polymers are measured in accordance with ASTM D-792-00. ASTM D-792-00 can also be used to measure density of other polymers as noted in this test.

The melt flow rate (MFR) of an propylene-based polymer is measured in accordance with ASTM D-1238-04, condition 230° C./2.16 kg. Melt index (I2) of an ethylene-based polymer is measured in accordance with ASTM D-1238-04, condition 190° C./2.16 kg.

Experimental

A18 (AFFINITY 1880G, available from The Dow Chemical Company) is an ethylene-octene copolymer having a density from 0.8995 to 0.9045 g/cc (1 cc=1 cm$^3$), and an $I_2$ from 0.75 to 1.25 g/10 min (190° C./2.16 kg).

E54 (ELITE 5400G, available from The Dow Chemical Company) is an polyethylene resin having a density from 0.9140 to 0.9180 g/cc, and an $I_2$ from 0.80 to 1.20 g/10 min (190° C./2.16 kg).

DO45 (DOWLEX 2045G, available from The Dow Chemical Company) is a linear low density ethylene-octene copolymer having a density from 0.9180 to 0.9220 g/cc, and a $I_2$ from 0.85 to 1.15 g/10 min (190° C., 2.16 kg).

PE32 (DOW LDPE132I, available from The Dow Chemical Company), is a low density polyethylene having a density from 0.9190 to 0.9230 g/cc, and an I2 from of 0.20 to 0.30 g/10 min (190° C., 2.16 kg).

PE64 (DOW LDPE 640I, available from The Dow Chemical Company) is a low density polyethylene having a density from 0.9180 to 0.9220 g/cc, and an $I_2$ from 1.6 to 2.4 g/10 min (190° C./2.16 kg).

V22 (VERSIFY 2200, available from The Dow Chemical Company) is a propylene-ethylene copolymer having a density from 0.874 to 0.878 g/cc, and an MFR from 1.6 to 2.4 g/10 min (230° C./2.16 kg).

NV22 (made by The Dow Chemical Company) is a propylene-ethylene copolymer having a density from 0.874 to 0.878 g/cc, and an MFR from 1.6 to 2.4 g/10 min (230° C./2.16 kg).

HDPE64 (UNIVAL DMDH-6400 NT 7, available from The Dow Chemical Company) is a high density polyethylene having a density from 0.9595 to 0.9630 g/cc, and an $I_{21}$ from 53.0 to 61.0 g/10 min (190° C./21.6 kg).

hPP31 is a polypropylene homopolymer with an MFR from 1.6 to 2.6 g/10 min (230° C./2.16 kg).

rPP6D is a random propylene/ethylene copolymer with an MFR from 1.6 to 2.2 g/10 min (230° C./2.16 kg).

FV22 and FNV22 correspond to the formulated versions of V22 and NV22 respectively. The detailed formulations are described in Table 1.

E94 (made by The Dow Chemical Company) is a medium density polyethylene having a density from 0.9380 to 0.9420 g/cc, and an $I_2$ from 0.75 to 0.95 g/10 min (190° C./2.16 kg). E94 contains 1500 ppm of calcium sterate as antiblock.

E59 (made by The Dow Chemical Company) is a high density polyethylene having a density from 0.9580 to 0.9650 g/cc, and an $I_2$ from 0.700 to 1.00 g/10 min (190° C./2.16 kg).

AF100 (ADFLEX T100F, available from Basell Polyolefins) is a flexible polypropylene having a density of 0.89 g/cc, and an MFR of 3.0 g/10 min (230° C./2.16 kg).

Antioxidants include IRGAFOS 168, IRGANOX 1010 and IRGANOX 1076. IRGAFOS 168 (available from Ciba) is a phosphite antioxidant. IRGANOX 1010 (available from Ciba) is a hindered phenolic antioxidant. IRGANOX 1076 (available from Ciba) is a monofunctional hindered phenolic antioxidant.

Slip 1 (AMPACET 102780, available from Ampacet) is an erucamide masterbatch with 5% erucamide as active ingredient and VERSIFY 3200 as carrier resin. This slip masterbatch was added to all VERSIFY resins when slip is indicated.

Antiblock or AB1 (AMPACET 102777, available from Ampacet) is an antiblock masterbatch with 20% diatomaceous earth as active ingredient and VERSIFY 3200 as carrier resin.

Slip 2 (AMPACET 100329, available from Ampacet) is an erucamide masterbatch with 5% erucamide as active ingredient and AFFINITY as carrier resin. This slip masterbatch was added to AFFINITY, DOWLEX and LDPE resins when slip is indicated.

Antiblock or AB2 (AMPACET 100342, available from Ampacet) is an antiblock masterbatch with 20% white mist (TIO2) as active ingredient and AFFINITY as carrier resin. This antiblock masterbatch was added to AFFINITY, DOWLEX and LDPE resins when antiblock is indicated.

Processing aid or PA: 6% fluoropolymer (DYNAMAR FX 5922X, available from Dyneon) in a VERSIFY 3200 carrier resin.

Slip BB: 5% benhenamide (INCROSLIP B, available from Croda) in a VERSIFY 3200 carrier resin.

Slip CE: 5% erucamide (INCROSLIP C, available from Croda) in a VERSIFY 3200 carrier resin.

AMPACET 101724-U is a slip polyethylene masterbatch with 10% ultra high molecular weight siloxane polymer as active ingredient. The carrier resin is LDPE.

A list of the compositions evaluated for taste properties is shown in Table 1.

The "ppm" amounts of additives, listed in Table 1, are each based on the total weight of each composition. Percentages are in weight percent.

Polymer Compositions

Compositions for the monolayer films were prepared in a twin screw extruder (Haake Rheomex PTW 25) at a melt temperature of 205° C. The melt string was cooled down with a chilled water bath and pelletized. To add slip, antiblock, and processing aid, the resins were compounded with the appropriate masterbatch(es) in the twin screw extruder. Compositions for the multilayer coextruded films were dry blended.

Blown Film Preparation

For the monolayer films, the compounded pellets or virgin pellets (if no additives were added) were processed at a monolayer blown film pilot line (Davis-Standard/Killion) with a 1¼ in extruder, 30:1 L/D and three inch spiral fed die. The "blow up" ratio was 2.5, and the melt temperature varied from 428° F. (220° C.) and 458° F. (237° C.). For the same material, the temperature was kept constant. The nominal film thickness was 4 mils. The films were wrapped in aluminum foil and sent for panel testing.

For the multilayer coextruded films, the dry blends were processed at a six inch, three-layer coextrusion blown film line (Battenfeld Gloucester), with two EGAN 2½ inch, 24:1 L/D extruders, and one "two inch" 24:1 L/D JOHNSON extruder. The line was equipped with a six inch die and air ring (Macro). The "blow up" ratio was 2.5, and the die temperature was set to 450° F. (232° C.). The film had a structure of A/B/A, with a ratio of 20/60/20, and a thickness of 2 mils. The films were wrapped in aluminum foil and sent for testing.

Polymer formulations are shown in Tables 1 and 2 below. As discussed above, these formulations were used in monolayer films and coextruded films.

TABLE 1

Polymer Formulations

| Ex. | Polymer | Additives | MFR or I2 (g/10 min) | Density (g/cc) |
|---|---|---|---|---|
| 1 | A18 | Antioxidants | 1.00 | 0.902 |
| 2 | E54 | Antioxidants | 1.00 | 0.916 |
| 3 | DO45 | Antioxidants | 1.00 | 0.920 |
| 4 | PE32 | none | 0.25 | 0.921 |
| 5 | PE64 | none | 2.00 | 0.922 |
| 6 | E94 | Antioxidants/Antiblock | 0.85 | 0.940 |
| 7 | HDPE64 | Antioxidants | 0.80 | 0.961 |
| 8 | E59 | Antioxidants | 0.85 | 0.962 |
| 9 | hPP31 | Antioxidants | 2.00 | 0.900 |
| 10 | rPP6D | Antioxidants | 1.90 | — |
| 11 | AF100 | n/a | 3.00 | 0.890 |
| 12 | V22 | Antioxidants | 2.00 | 0.876 |
| 13 | NV22 | Antioxidants | 2.00 | 0.876 |

TABLE 2

Polymer Formulations

| Ex. | Polymer | Additives |
|---|---|---|
| 14 | V22 w/slip 1, AB1 and PA | Antioxidants; erucamide (2500 ppm); diatomaceous earth (3000 ppm); fluoropolymer based PA (600 ppm) |
| 15 | V22 w/BB, AB1, PA | Antioxidants; benhenamide (2500 ppm); diatomaceous earth (3000 ppm); fluoropolymer based PA (600 ppm) |
| 16 | V22 w/CE, AB1, PA | Antioxidants; erucamide (2500 ppm); diatomaceous earth (3000 ppm); fluoropolymer based PA (600 ppm) |
| 17 | FOV22 (V22 w/AMPACET 101724-U, AB1, PA) | Antioxidants; siloxane (10000 ppm); diatomaceous earth (3000 ppm); fluoropolymer based PA (600 ppm) |
| 18 | FV22 | Antioxidants; siloxane (15000 ppm); diatomaceous earth (6000 ppm); fluoropolymer based PA (600 ppm) |
| 19 | FNV22 | Antioxidants; siloxane (15000 ppm); diatomaceous earth (6000 ppm); fluoropolymer based PA (600 ppm) |
| 20 | A18 w/slip 2, AB2 | Antioxidants; erucamide (2500 ppm); TIO2 (3000 ppm) |
| 21 | DO45/PE32 w/slip 2, AB2 | DO45 (80%); PE32 (15.5%); Antioxidants; erucamide (1500 ppm); TIO2 (3000 ppm) |

Evaluation of Taste Performance

Ozone sterilized water samples (also referred to as ozonated samples) and non-ozonated water samples were prepared for comparison. For the non-ozonated water samples, blown film (5 g) was immersed in 900 mL of OZARKA brand drinking water, and kept for 20 hours, at room temperature, in a closed glass jar. For ozonated water samples, blown film (5 g) was immersed in 900 mL of OZARKA brand drinking water, and ozone, generated by an OzoneLab™ 0L80F/S ozonation equipment (Ozone Services), was bubbled into the water for a specific time, until the OzoneLab™ ORP Monitor Probe (Ozone Services) measured 810 mV, which corresponds to 0.4 ppm ozone, according to the instrument calibration curve. The glass jar was closed, and also kept for 20 hours at room temperature.

The water samples were then given to a group of 24 trained panelists for taste evaluation. A maximum of four samples were randomly presented to the panelists, along with a replicate set to check for reproducibility. Each set of at the most four samples was ranked according to taste intensity from 1 to n; 1 being the least intense, and n being the most intense (n=maximum number of samples tested). In addition, each sample was subject to a hedonic rating from 1 to 9; 1 being "dislike extremely" and 9 being "like extremely." Traditionally, OZARKA brand drinking water has been rated by the panelists as "5.2," which corresponds to "neither like nor dislike." Panelists also provided a taste descriptor for each sample (for example, "no taste," "polymer," "bitter," etc.). For comparison, the results of the panelist evaluations were represented as plots of intensity ranking versus hedonic rating. Results are shown in FIGS. 1, 5, 6 and 7.

FIG. 1 compares the non-ozonated and ozonated water taste performance of a film formed from V22 to films formed from typical polyethylene sealants. The films shown in FIG. 1 contained the same type and level of antioxidants, except for PE64 film, which contains no additives. For non-ozonated water, the film formed from the PE64 contributed the most intense taste to water, whereas the A18, E54 and V22 films all showed a least intense taste, being rated at about 4.3 as "disliked slightly," which indicates that they are acceptable for use in food and specialty packaging applications. In particular, polyethylene sealants, such as the A18 film, are known to have little or no contribution to taste and odor. However, with ozonation, the taste performance of the A18 film changed significantly from "disliked slightly" to "dislike moderately," whereas the V22 film retained its hedonic rating, and contributed the least intense taste to water. The PE64 film remained as the worst performer.

Figure 2:
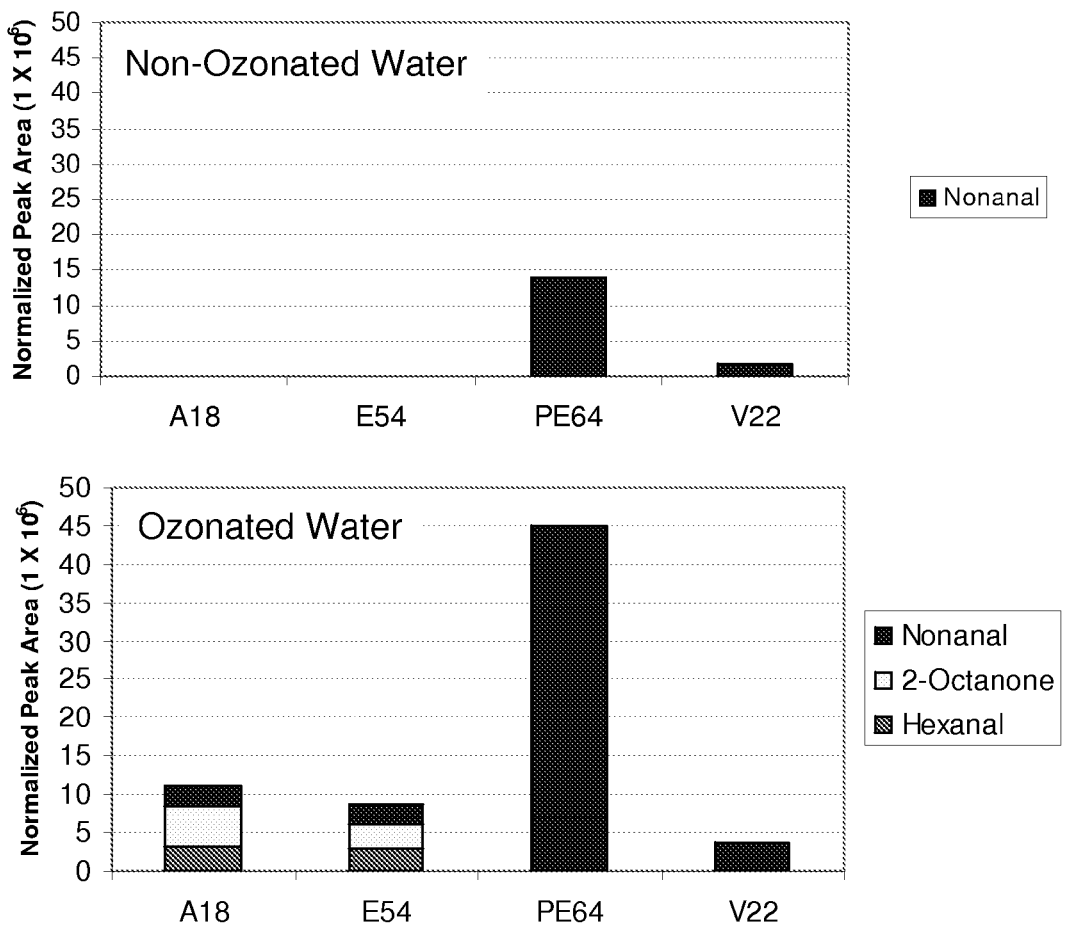
FIG. 2 depicts the relative amounts of aldehydes and a ketone in non-ozonated and ozonated water samples, each exposed to the noted films.
Figure 3:
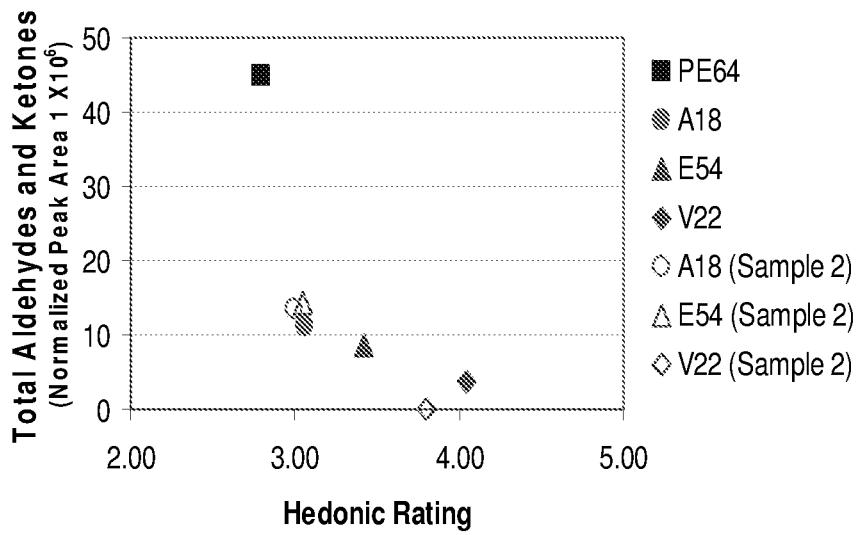
FIG. 3 depicts the correlation between the relative amounts of aldehydes and ketone versus the hedonic ratings for ozonated water exposed to the noted films.

Off-taste of polymeric materials is usually caused by a perceivable amount, usually in ppb, of short-chain (C4-C11) aldehydes and ketones in the taste medium (see *Migration of Volatile Degradation Products into Ozonated Water from Plastic Packaging Materials*; Song, Y. S.; Al-Taher, F.; Sadler, G. *Food Additives & Contaminants*, (2003), 20(10), 985-994). FIG. 2 shows the relative amount of aldehydes and ketones found in the non-ozonated and ozonated water samples discussed in FIG. 1. The amount of these species was determined by Immersion SPME (Solid-Phase Microextraction). In the case of non-ozonated water, PE64, which contributed the most intense taste to water, exhibited the highest nonanal content, whereas aldehydes and ketones were not detected in the polyethylene sealants, which had acceptable taste. With ozonation, the nonanal content in PE64, which had the most contribution to taste, increased about three-fold, and a fair amount of C6-C9 aldehydes and ketones were found in the polyethylene sealants, rated as "dislike moderately," whereas the small amount of nonanal in V22, which had the best taste performance, did not change significantly with ozonation. The correlation between the relative amount of aldehydes and ketones and the hedonic ratings is summarized in FIG. 3.

Figure 4:
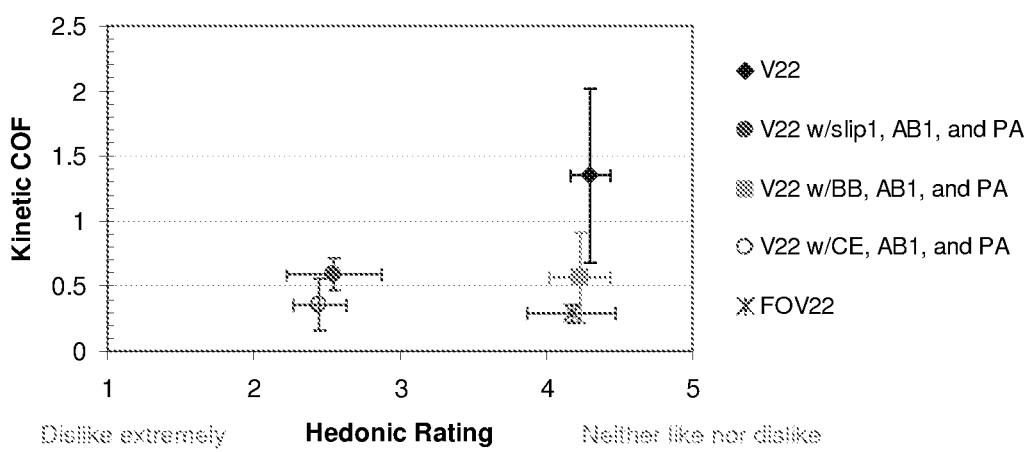
FIG. 4 depicts the kinetic COF (Coefficient of Friction) versus hedonic ratings for ozone treated water exposed to the noted films.

For automatic packaging, a low Coefficient of Friction (COF) is required. Slip and antiblock agents are usually added to reduce COF. If a slip agent, such as erucamide, is added to V22, the "ozonated water taste performance" of water, exposed to a film prepared from this V22 composition, worsens significantly from "dislike slightly" to "dislike very much," or from 4 to 2. On the other hand, the addition of antiblock and other additives, such as a processing aid, does not seem to significantly affect the taste performance of V22. In order to adequately control COF, without affecting the "ozonated water taste performance" of V22, other types of slip agents were evaluated. FIG. 4 shows the hedonic rating of V22 with several slip agents against kinetic COF. The slip agents that do not seem to affect the taste performance of V22 are those without any unsaturations, for example (benhenamide and siloxane) as previously reported. The formulation containing the siloxane (FOV22), provided the best combination of COF and "ozonated water taste performance" to V22.

Figure 5:
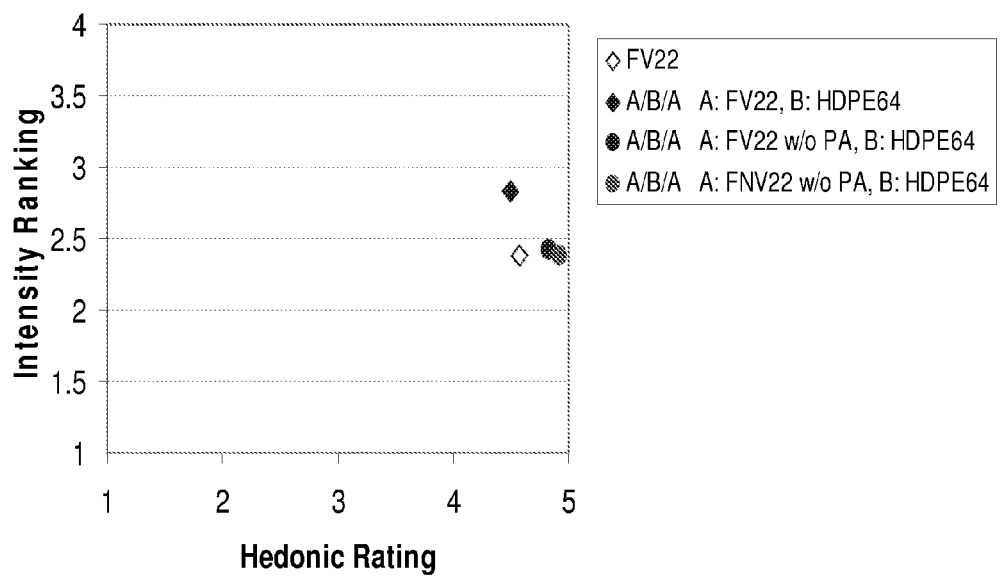
FIG. 5 depicts the hedonic ratings for ozonated water exposed to noted coextruded films.

FIG. 5 compares the ozonated water taste performance of a film containing at least one layer formed from V22, with a similar film containing at least one layer formed from NV22. The comparison was made using coextruded structures containing a core layer formed from a HDPE, and the outer layers formed from FV22 or FNV22. The FV22 and FNV22 were each formulated according to Table 2, but without a processing aid. Two structures with processing aid, one monolayer film and one coextruded film, were included as references. Both the FV22 and FNV22 coextruded films exhibited excellent organoleptic performance in contact with ozone sterilized water.

Figure 6:
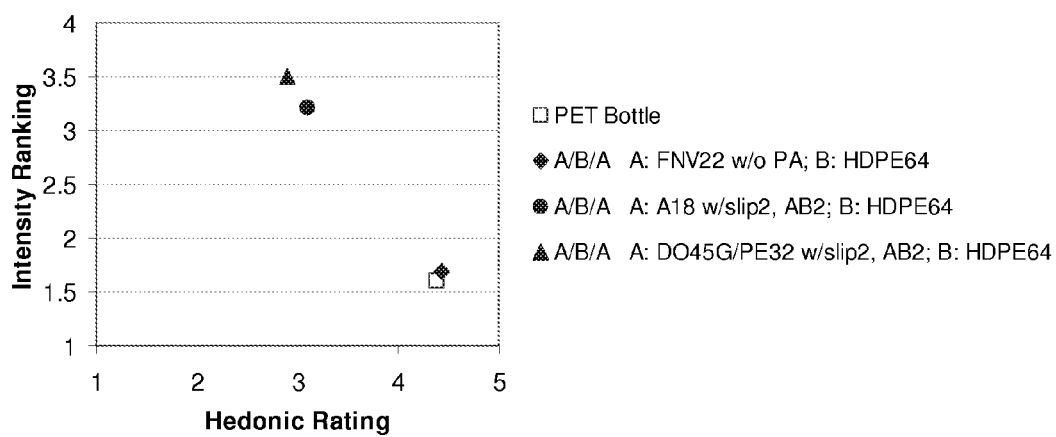
FIG. 6 depicts the hedonic ratings of ozonated water exposed to the noted coextruded films and a polyethylene terephthalate bottle.

The "ozonated water taste performance" of the coextruded films, each containing a core layer formed from a HDPE, and outer layers formed from FNV22 (without PA), A18 (with slip), or DO45G/PE32 (with slip), were compared. These coextruded films were also compared to a PET bottle (conventional bottle resin for ozonated water). The FNV22 film performed very similarly to the market incumbent, PET (see FIG. 6). FIG. 6 also shows the excellent performance of the FNV22 film compared to the other films.

Figure 7:
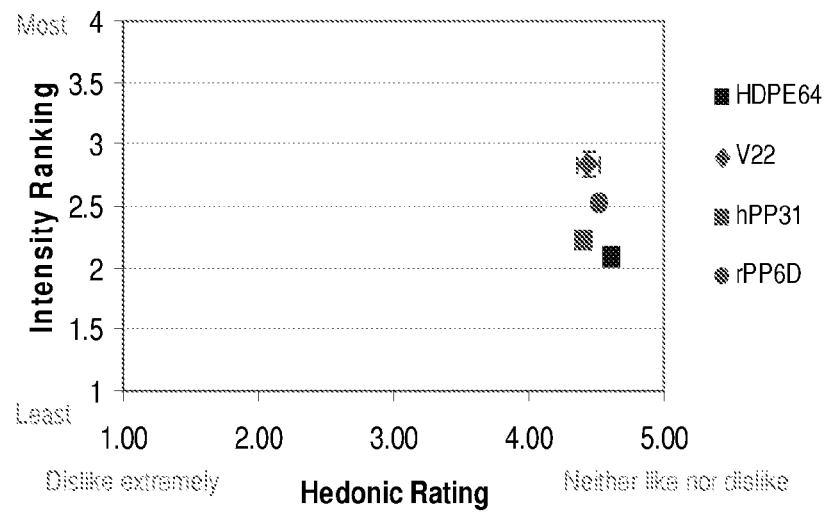
FIG. 7 depicts the hedonic ratings of ozonated water exposed to the noted films.

The ozonated water taste performance of V22 was compared to existing technologies such as rigid containers made from polyolefin materials. V22 performs very similarly to a film made of HDPE64, currently used to manufacture rigid containers and water jugs, used in ozonated water packaging (see FIG. 7). FIG. 7 also shows that polypropylene homopolymer (hPP) and random polypropylene copolymer (rPP) exhibit comparable taste performance to V22. No aldehydes and ketones were found in any of these samples after ozonation.

It is hypothesized that the oxygenated species that are responsible for the off-taste observed in ozonated water are produced by undesirable reactions of ozone with low molecular weight material (present in soluble fractions of a polymer) and/or unsaturations present in the polymer or its additives. To test the hypothesis, the relative amount of polymer soluble fraction was measured by xylene solubles, whereas the level of unsaturations was measured using 1H NMR spectroscopy.

The xylene solubles, which are a measure of the amount of the material in the polyolefin remaining in solvent at defined temperature, were determined by ASTM method D5492 (2006). The sample (8 grams) was analyzed. For HDPE64, the results were based on 50 ml instead of 100 ml aliquot. The xylene soluble calculation was adjusted to account for this difference.

The results for the polyethylene and polypropylene materials, as compared to V22, are shown in Table 3 below. Considering all the polyolefin materials, no direct correlation was observed between the amount of xylene solubles and taste performance. However, it is important to note that for the polyethylene materials, the high density polyethylene type material, HDPE64, exhibits the lowest amount of xylene extractables, and the best hedonic rating.

Figure 8:
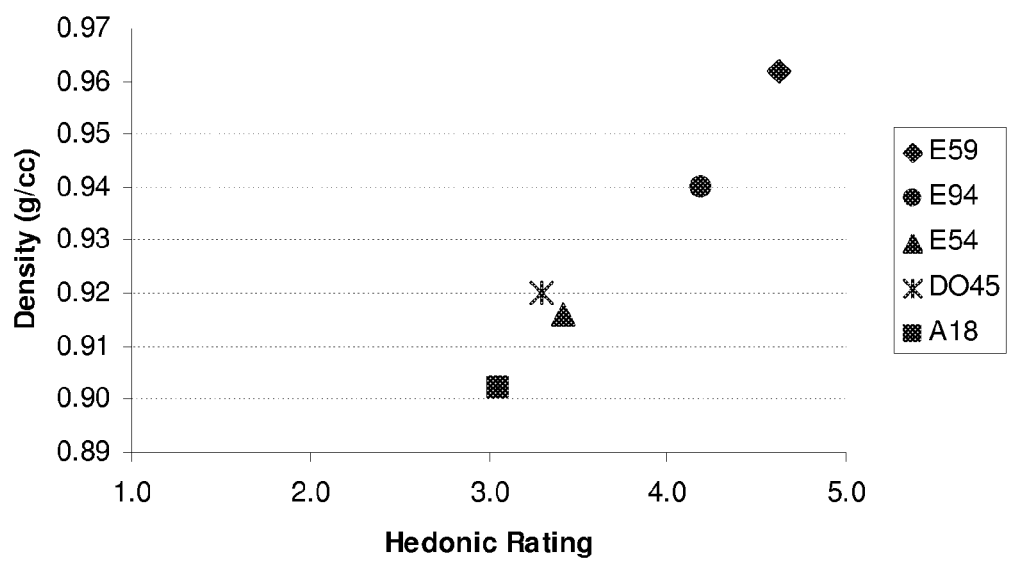
FIG. 8 depicts the polymer density versus hedonic rating for ozonated water exposed to the noted films.

For the ethylene-octene materials, it was found that density plays a major role in the organoleptic performance in ozone sterilized water. FIG. 8, shows a strong correlation between hedonic rating and density of the ethylene-octene copolymers analyzed, indicating that the density has a major effect in the taste performance in contact with ozone sterilized water.

TABLE 3

| Non-Ozonated Polymer Film | Hedonic Rating | Xylene Solubles (wt. %) |
|---|---|---|
| HDPE64 | 4.6 | 0.4 |
| rPP6D | 4.5 | 5.7 |
| hPP31 | 4.4 | 4.9 |
| V22 | 4.1 | 50.4 |
| E54 | 3.4 | 1.2 |
| DO45 | 3.3 | 2.4 |
| A18 | 3.1 | 1.1 |
| PE64 | 2.8 | 1.6 |

Proton NMR

Proton Nuclear Magnetic Resonance ($^1$H NMR) spectroscopy was used to determine the unsaturated end group structure in the polymer samples. Samples were prepared by adding approximately 10 mg of the polymer to 0.5 ml of solvent, in a 5 mm NMR tube. The solvent was a 50/50 by weight mixture of 1,1,2,2-tetrachloroethane-d2 (TCE) and perchloroethylene. The samples were dissolved and homogenized by heating and vortexing the tube, and its contents, at 115° C.-120° C.

The data was collected using a Varian INOVA 500 MHz NMR spectrometer. A standard $^1$H NMR spectrum was collected to give the ratio of the "whole" polymer (integral 3.0-0.5 ppm) relative to the TCE-d2 (which is normalized to 100 integral units). Acquisition parameters for the standard $^1$H NMR spectrum included 40 transients per data file, 1.6 second acquisition time, 29 second relaxation delay, spectral width of 10,000 Hz, file size of 32K data points, and temperature set point of 115° C. A second experiment used a presaturation pulse to suppress the main chain carbons from the polymer. The unsaturated end groups were then integrated relative to the TCE-d2 (which is normalized to 100 integral units). The acquisition parameters used for the presaturation experiment include 200 transients per data file, 1.6 second acquisition time, 25 second relaxation delay, spectral width of 10,000 Hz, file size of 32K data points, temperature set point of 115° C., and saturation delay 4.0 seconds. Number of transients can be increased in order to achieve adequate signal to noise ratio, for example, 10:1 for quantitated peaks.

The ratio of the terminal vinyl groups to the sum of all of the unsaturations, Rv, is defined below. Rv is determined using 1H NMR spectroscopy. The Rv value is defined as:

$$Rv = \frac{[\text{vinyl}]}{[\text{vinyl}] + [\text{vinylidene}] + [cis] + [trans] + [trisubstituted]}.$$

In the above equation, [vinyl] is the concentration of vinyl groups in the isolated polymer in vinyls/1,000 carbon atoms; [vinylidene], [cis], and [trans] [trisubstituted] are the concentration of vinylidene, cis and trans and trisubstituted groups in the isolated polymer in amount/1,000 carbon atoms, respectively. The amount of each unsaturation and the amount of backbone carbon from "whole" polymer can be determined from the peak integration of each respective peak, as known in the art. Each integral is normalized to the 1,1,2,2,-tetrachhloroethane-d2 region.

Calculations for Ethylene-Octene Samples:

The moles of each end group are determined in by integrating each signal corresponding to the various unsaturated end groups plus the backbone. The solvent is used to normalize the presaturation and non-presaturation spectra. The moles of backbone (integral 3.0-0.5 ppm) as CH, CH2, and CH3 from the "whole" polymer are quantified using the non-presaturation experiment, and the moles of end group are quantified using the presaturation experiment. The vinyl/1000 C (or other unsaturated end group) is determined by dividing the moles of vinyl (or other end group) by the moles of CH, CH2, and CH3 from the "whole" polymer with this quantity and then multiplied by 1000.

Calculations for Propylene-Ethylene Samples:

The moles of each end group are determined by integrating each signal corresponding to the various unsaturated end groups plus the backbone. The solvent is used to normalize the presaturation and non-presaturation spectra. The moles of backbone are calculated using $^{13}$C NMR mole fraction of propylene. The backbone region (integral 3.0-0.5 ppm) in the non-presaturation spectrum is multiplied by the 13C NMR mole fraction of propylene which is divided by 6 protons to give mole % propylene. The polypropylene backbone CH, CH2, and CH3 from the "whole" polymer are quantified using the non-presaturation experiment and the moles of end group are quantified using the presaturation experiment. The vinyl/1000C (or other unsaturated end group) is determined by dividing the moles of vinyl (or other end group) by the moles of CH, CH2, and CH3 from the "whole" polymer with this quantity and then multiplied by 1000.

Figure 9:
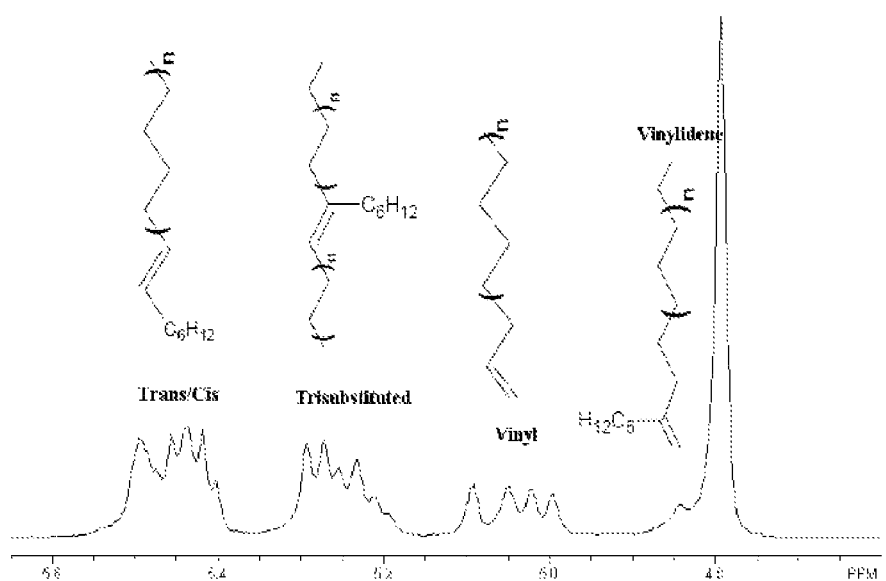
FIG. 9 depicts 1H NMR regional assignments of an ethylene/octene copolymer.

Table 4 show the $^1$H NMR unsaturation results. For reference, the chemical structures of observed unsaturations, as well as the $^1$H NMR spectrum of an ethylene-octene copolymer, indicating regional assignments, is shown in FIG. 9. Table 5 shows that the lack of unsaturations in V22 and NV22 is consistent with their good taste performance in the presence of ozone sterilized water. In the case of the ethylene-based polymers, however, the amount of unsaturations does not correlate with taste performance (see Table 4).

Figure 10:
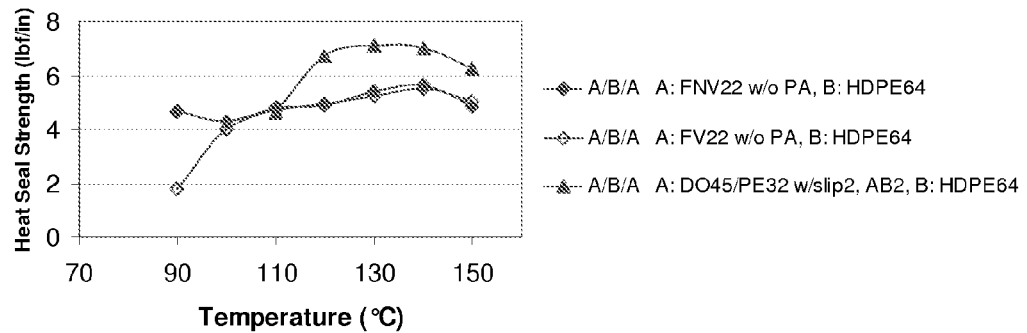
FIG. 10 depicts "heat seal strength versus temperature" profiles for the noted coextruded films.

FIG. 10 shows the heat seal curve (Heat seal Strength vs. Temp.) comparing the coextruded samples made with the FNV22 and FV22 propylene-ethylene copolymers as sealant. The heat seal initiation temperature of the FNV22 coextruded film was significantly lower than that of the FV22 coextruded film. At 90° C., the heat seal strength of the FNV22 film is at least twice that of the FV22 film. Lower heat seal initiation temperature means a broader heat seal window, which, in turn, allows for more consistent sealing in automatic packaging lines, as well as higher packaging speeds. The ultimate heat seal strength, on the other hand, remains the same.

Hot tack measurements of the coextruded films made with the FNV22 and FV22 propylene-ethylene copolymer as sealant, were performed according to ASTM F-1921, which measures the force required to separate a heat seal before the seal has had a chance to fully cool (crystallize). This test simulates the filling of material into a pouch or bag, before the seal has had a chance to completely cool. A JB Instrument Hot Tack Tester makes seals at various seal bar temperatures, and measures the force of separation utilizing a transducer. This instrument was used with the following parameters.

Specimen Width: 25.4 mm (1.0 in)
Sealing Pressure: 0.275 N/mm$^2$ (40 psi)
Sealing Dwell Time: 0.5 s
Delay time: 0.1 s
Peel speed: 200 mm/s
Number of samples per temperature: 4

In the case of hot tack, the temperature at the hot-tack strength of "4 N/inch" is taken as the hot-tack initiation tem-

TABLE 4

$^1$H NMR Results

| Sample | Vinyl (mole %) | Cis and Trans (mole %) | Trisubstituted Cis&Trans (mole %) | Vinylidene (mole %) | Total Unsaturations (mole %) | Hedonic Rating |
| --- | --- | --- | --- | --- | --- | --- |
| HDPE64 | 0.0879 | 0.0000 | 0.0000 | 0.0000 | 0.0879 | 4.6 |
| E59 | 0.0235 | 0.0000 | 0.0000 | 0.0000 | 0.0235 | 4.6 |
| E54 | 0.0117 | 0.0000 | 0.0000 | 0.0018 | 0.0136 | 3.4 |
| DO45 | 0.0016 | 0.0000 | 0.0000 | 0.0002 | 0.0018 | 3.3 |
| A18 | 0.0000 | 0.0059 | 0.0000 | 0.0073 | 0.0132 | 3.1 |
| PE64 | 0.0026 | 0.0069 | 0.0000 | 0.0027 | 0.0122 | 2.8 |
| V22 | 0.0000 | 0.0000 | 0.0000 | 0.0000 | 0.0000 | 4.0 |
| NV22 | 0.0000 | 0.0000 | 0.0000 | 0.0000 | 0.0000 | 4.9 |
| AF100 | 0.0000 | 0.0000 | 0.0000 | 0.0078* | 0.0078* | 4.0 |

*The percentage of vinylidene unsaturation is reported at the level of detection Heat Seal and Hot Tack Strength Study Heat seal measurements were performed according to ASTM F-88, which is designed to measure the force required to separate a seal (formed at a noted seal temperature) after the material has completely cooled to 23° C. The samples were sealed using a KOPP instrument and conditioned for 24 hours, at 23° C., before testing in an Instron Tensile Tester. The following parameters were used:

Specimen Width: 25.4 mm (1.0 in)
Sealing Pressure: 0.27 N/mm$^2$ (40 psi)
Sealing Dwell Time: 0.25 s
Direction of Pull: 90° to seal
Peel speed: 254 mm/min (10 in/min)
Number of samples per temperature: 5

Figure 11:
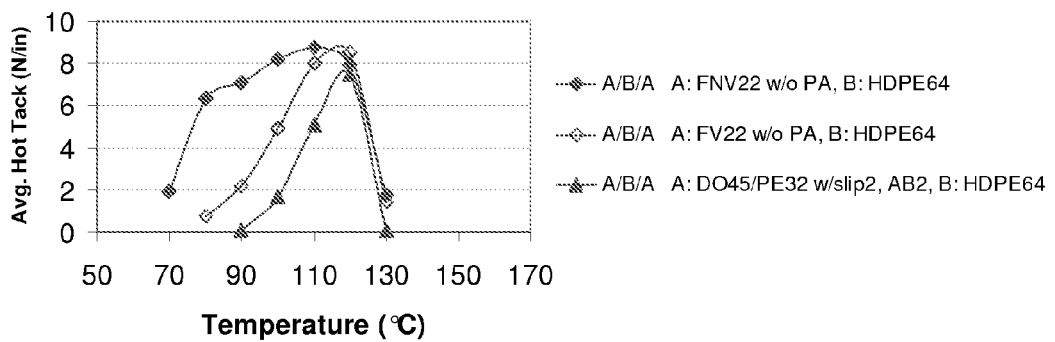
FIG. 11 depicts "average hot tack strength versus temperature" profiles for the noted coextruded films.

Heat seal initiation temperature (HSIT) is defined as the temperature at which a seal strength of "1 lb/inch" is obtained. This definition is only a benchmark, since the required heat seal strength will vary from application to application. Ultimate seal strength is the highest heat seal strength obtained on a curve of seal strength versus seal temperature.

perature. This value is a benchmark only, since the minimum requirement for hot tack will vary from application to application. Ultimate hot-tack strength is the peak value of the curve. Hot tack range is the temperature range across which a minimum hot tack value is obtained. FIG. 11 shows the hot tack curve (Average Hot Tack vs. Temp.), comparing the coextruded samples made with the FNV22 or FV22 propylene-ethylene copolymers as sealant. The hot tack initiation temperature of the coextruded sample made with the FNV22 as the sealant layer is significantly lower (at least 20° C.) than that of FV22 coextruded film. Lower hot tack initiation temperature means a broader hot tack window, which, in turn, allows for more consistent sealing in automatic packaging lines, as well as higher packaging speeds. The ultimate hot tack strength, on the other hand, remains the same.

Although the invention has been described in certain detail through the preceding specific embodiments, this detail is for the primary purpose of illustration. Many variations and modifications can be made by one skilled in the art, without departing from the spirit and scope of the invention, as described in the following claims.

The invention claimed is:

1. A film comprising at least one layer formed from a composition comprising a propylene-based polymer and a saturated compound, selected from the group consisting of aliphatic amides, hydrocarbon waxes, hydrocarbon oils, fluorinated hydrocarbons, siloxanes, and combinations thereof; and
wherein the propylene-based polymer has less than 0.01 mole percent total unsaturations, as determined by 1H NMR, and
wherein the film comprises at least two layers, and has a heat seal strength greater than 3 lb/inch, at a sealing temperature from 90° C. to 95° C.

2. The film of claim 1, wherein the film has a heat seal strength of at least 3 lb/inch, at a sealing temperature of greater than 90° C.

3. The film of claim 1, wherein the propylene-based polymer comprises (A) at least 60 weight percent (wt %) units derived from propylene, and (B) from 1 to 40 wt % units derived from ethylene, and wherein the propylene-based polymer is characterized by at least one of the following properties: (1) a g' ratio of less than one, measured at polymer number average molecular weight ($M_n$), (2) a relative compositional drift of less than 50%, and (3) propylene chain segments having a chain isotacticity triad index of at least 70 mole percent.

4. The film of claim 1, wherein the propylene-based polymer is characterized by at least one of the following properties:
  (a) a weight average molecular weight (Mw) of at least 50,000 grams per mole (g/mol);
  (b) an Mw/Mn of less than 4;
  (c) a critical shear rate at the onset of surface melt fracture (OSMF) of at least 4,000 sec$^{-1}$;
  (d) an I10/I2 at 230° C. greater than or equal to (≥) 5.63;
  (e) a nominal weight percent crystallinity from greater than 0 to 40 wt %; and,
  (f) a single melting point as measured by differential scanning calorimetry (DSC).

5. The film of claim 1, wherein the propylene-based polymer is characterized by at least one of the following properties:
  (a) A weight average molecular weight ($M_w$) of at least 50,000 grams per mole (g/mol);
  (b) An $M_w/M_n$ of less than 4;
  (c) A critical shear rate at the onset of surface melt fracture (OSMF) of at least 4,000 sec$^{-1}$; and
  (d) A nominal weight percent crystallinity from greater than 2 to 40 weight percent.

6. The film of claim 1, wherein the saturated compound contains a structural unit represented by Formula (I):

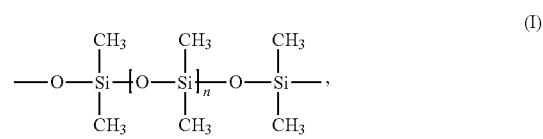

where n is greater than 10.

7. The film of claim 1, wherein the saturated compound is represented by Formula (II):

$$CH_3—(CH_2)_n—CONH_2 \quad \quad (II),$$

wherein n is greater than, or equal to, 6.

8. The film of claim 1, wherein the saturated compound is a hydrocarbon wax.

9. The film of claim 1, wherein the saturated compound is a hydrocarbon oil.

10. The film pouch, wherein an interior layer of the pouch is formed from the film of claim 1.

11. The film of claim 1, wherein the saturated compound is a fluorinated hydrocarbon.

12. The film pouch of claim 11, wherein an outer layer of the pouch is formed from a composition comprising a HDPE, a polypropylene homopolymer, or a propylene-based polymer.

13. A composition comprising a propylene-based polymer and a saturated compound, selected from the group consisting of aliphatic amides, hydrocarbon waxes, hydrocarbon oils, fluorinated hydrocarbons, siloxanes, and combinations thereof, and
wherein the propylene-based polymer comprises (A) at least 60 weight percent (wt %) units derived from propylene, and (B) from 1 to 40 wt % units derived from ethylene, and wherein the propylene polymer has an average of at least 0.001 long chain branches per 1000 total carbons, and is characterized by the following properties: (1) a g' ratio of less than one, measured at polymer number average molecular weight ($M_n$), (2) a relative compositional drift of less than 50%, and (3) propylene chain segments having a chain isotacticity triad index of at least 70 mole percent.

14. The composition of any of claim 13, wherein the propylene-based polymer is characterized by at least one of the following properties:
  (a) a weight average molecular weight ($M_w$) of at least 50,000 grams per mole (g/mol);
  (b) a $M_w/M_n$ of less than 4;
  (c) a critical shear rate at the onset of surface melt fracture (OSMF) of at least 4,000 sec$^{-1}$; and
  (d) a nominal weight percent crystallinity of from greater than 2 to 40 weight percent.

* * * * *